United States Patent
Cheng et al.

(10) Patent No.: US 9,713,040 B2
(45) Date of Patent: Jul. 18, 2017

(54) COMMUNICATION SYSTEM, MOBILE TERMINAL, ROUTER, AND MOBILITY MANAGEMENT ENTITY

(75) Inventors: Hong Cheng, Singapore (SG); Chan Wah Ng, Singapore (SG); Shinkichi Ikeda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 182 days.

(21) Appl. No.: 14/112,382

(22) PCT Filed: Mar. 23, 2012

(86) PCT No.: PCT/JP2012/002023
§ 371 (c)(1),
(2), (4) Date: Oct. 17, 2013

(87) PCT Pub. No.: WO2012/147270
PCT Pub. Date: Nov. 1, 2012

(65) Prior Publication Data
US 2014/0036873 A1    Feb. 6, 2014

(30) Foreign Application Priority Data

Apr. 28, 2011   (JP) .................. 2011-101689

(51) Int. Cl.
*H04W 36/00* (2009.01)
*H04W 36/14* (2009.01)

(52) U.S. Cl.
CPC ... *H04W 36/0033* (2013.01); *H04W 36/0022* (2013.01); *H04W 36/14* (2013.01)

(58) Field of Classification Search
None
See application file for complete search history.

(56) References Cited

U.S. PATENT DOCUMENTS 8,270,978 B1 * 9/2012 Faccin .............. H04W 36/0016
                                                            370/331
8,526,951 B2 * 9/2013 Sawamoto .................... 455/436
(Continued)

FOREIGN PATENT DOCUMENTS

JP    2010-520653 A    6/2010
WO    2008/109403 A1   9/2008

OTHER PUBLICATIONS

General Packet Radio Service (GPRS) enhancements for Evolved Universal Terrestrial Radio Access Network (E-UTRAN) access, 3GPP TS 23.401 V10.2.0 Release 10, Dec. 2010, http://www.3gpp.org/ftp/Specs/archive/23_series/23.401/23401-a20.zip.

(Continued)

*Primary Examiner* — Jeffrey M Rutkowski
*Assistant Examiner* — Jonathan B Wood
(74) *Attorney, Agent, or Firm* — Pearne & Gordon, LLP

(57) ABSTRACT

With the deployment of the Mobile Routers, some of the mobile devices would access the IP services, e.g. Remote Local IP Access (LIPA), via the local connections provided by the Mobile Router. In such cases, the mobile devices may be detached from the 3GPP access, and thus lose the capability of receiving certain services, e.g. CS domain related services. This invention presented a solution to allow the mobile device to continue enjoying the services provided via 3GPP access by placing the mobile device into a special state and binding Mobile Router's context with the mobile device's context. In this way, the mobile operator's core network would be able to trigger the mobile device to receive the CS service even its 3GPP access connections are removed.

19 Claims, 8 Drawing Sheets

(56) References Cited

U.S. PATENT DOCUMENTS

| | | | |
|---|---|---|---|
| 8,630,645 B2* | 1/2014 | Chowdhury et al. | 455/436 |
| 8,687,590 B2* | 4/2014 | Cai et al. | 370/331 |
| 8,718,647 B2* | 5/2014 | Maheshwari | 455/436 |
| 8,781,480 B2* | 7/2014 | Lim et al. | 455/444 |
| 8,917,701 B2* | 12/2014 | Takahashi | H04W 36/0083 370/231 |
| 9,066,242 B2* | 6/2015 | Kazmi | |
| 2005/0147062 A1* | 7/2005 | Khouaja et al. | 370/332 |
| 2007/0189316 A1* | 8/2007 | Qing et al. | 370/412 |
| 2007/0264955 A1* | 11/2007 | Tsai et al. | 455/186.1 |
| 2008/0212509 A1* | 9/2008 | Kim et al. | 370/312 |
| 2008/0316972 A1* | 12/2008 | Shaheen | H04W 36/0033 370/331 |
| 2009/0073933 A1* | 3/2009 | Madour et al. | 370/331 |
| 2009/0221303 A1 | 9/2009 | Soliman | |
| 2009/0232019 A1* | 9/2009 | Gupta et al. | 370/252 |
| 2009/0264131 A1* | 10/2009 | Wu | H04W 36/0005 455/436 |
| 2009/0274122 A1* | 11/2009 | Wu | H04W 76/064 370/331 |
| 2009/0318147 A1* | 12/2009 | Zhang et al. | 455/435.1 |
| 2009/0325578 A1* | 12/2009 | Li et al. | 455/436 |
| 2010/0040024 A1* | 2/2010 | Wu | H04L 63/0892 370/331 |
| 2010/0046419 A1* | 2/2010 | Hirano | H04W 8/082 370/315 |
| 2010/0056160 A1* | 3/2010 | Kim et al. | 455/444 |
| 2010/0103903 A1* | 4/2010 | Park et al. | 370/331 |
| 2010/0135246 A1* | 6/2010 | Hallental | 370/331 |
| 2010/0157943 A1* | 6/2010 | Horn | 370/331 |
| 2010/0203905 A1* | 8/2010 | Chaubey et al. | 455/458 |
| 2010/0227617 A1* | 9/2010 | Jung et al. | 455/438 |
| 2010/0232393 A1* | 9/2010 | Shuai et al. | 370/331 |
| 2010/0296421 A1* | 11/2010 | Watfa | H04W 76/027 370/310 |
| 2010/0303041 A1* | 12/2010 | Diachina et al. | 370/331 |
| 2010/0311419 A1* | 12/2010 | Bi | H04W 60/00 455/435.1 |
| 2010/0322189 A1* | 12/2010 | Qiang | H04L 63/029 370/331 |
| 2011/0013587 A1* | 1/2011 | Serravalle | 370/331 |
| 2011/0044279 A1* | 2/2011 | Johansson | H04W 92/20 370/329 |
| 2011/0064054 A1* | 3/2011 | Parsons | H04W 36/0033 370/331 |
| 2011/0085471 A1* | 4/2011 | Zhang | H04W 16/00 370/254 |
| 2011/0092212 A1* | 4/2011 | Kubota | 455/436 |
| 2011/0122843 A1* | 5/2011 | Iwamura et al. | 370/331 |
| 2011/0122845 A1* | 5/2011 | Meirosu et al. | 370/332 |
| 2011/0128937 A1* | 6/2011 | Iwamura et al. | 370/331 |
| 2011/0149913 A1* | 6/2011 | Park et al. | 370/332 |
| 2011/0211557 A1* | 9/2011 | Cheng et al. | 370/331 |
| 2011/0225632 A1* | 9/2011 | Ropolyi | H04W 48/16 726/4 |
| 2011/0256891 A1* | 10/2011 | Soliman et al. | 455/458 |
| 2011/0287743 A1* | 11/2011 | Hu et al. | 455/411 |
| 2011/0296125 A1* | 12/2011 | Shaikh et al. | 711/159 |
| 2012/0040678 A1* | 2/2012 | Matsunami et al. | 455/436 |
| 2012/0084388 A1* | 4/2012 | De Foy et al. | 709/217 |
| 2012/0099578 A1* | 4/2012 | Aramoto et al. | 370/338 |
| 2012/0113905 A1* | 5/2012 | Anderson et al. | 370/329 |
| 2012/0113959 A1* | 5/2012 | Sugizaki et al. | 370/331 |
| 2012/0140700 A1* | 6/2012 | Huang | H04W 36/12 370/315 |
| 2012/0170552 A1* | 7/2012 | Oprescu-Surcobe | H04W 28/16 370/332 |
| 2012/0182859 A1* | 7/2012 | Ikeda et al. | 370/216 |
| 2012/0188984 A1* | 7/2012 | Takahashi et al. | 370/331 |
| 2012/0196593 A1* | 8/2012 | Jung et al. | 455/434 |
| 2012/0207128 A1* | 8/2012 | Wang | 370/331 |
| 2012/0230296 A1* | 9/2012 | Hapsari et al. | 370/331 |
| 2012/0236828 A1* | 9/2012 | Hapsari et al. | 370/331 |
| 2012/0307797 A1* | 12/2012 | Yuan | H04W 36/0022 370/331 |
| 2013/0250909 A1* | 9/2013 | Xie et al. | 370/331 |
| 2013/0337813 A1* | 12/2013 | Van Phan | H04W 36/08 455/436 |

OTHER PUBLICATIONS

"3rd Generation Partnership Project; Technical Specification Group Services and System Aspects; Security of Home Node B (HNB) / Home evolved Node B (HeNB)", (Release 10), 3GPP TS33.320 V10.2.0, Mar. 2011, http://www.3gpp.org/ftp/Specs/archive/33_series/33.320/33320-a20.zip.

"3rd Generation Partnership Project; Technical Specification Group Core Network and Terminals; Non-Access-Stratum (NAS) protocol for Evolved Packet System (EPS)" Stage 3, 3GPP TS24.301 V10.1.0, Release 10, Dec. 2010.

"3rd Generation Partnership Project; Technical Specification Group Services and System Aspects; Study on S2a Mobility based on GTP & WLAN access to EPC (SaMOG)" Stage 2, (Relaease 11), 3GPP TR23.852 v1.0.0 Dec. 16, 2011 http://www.3gpp.org/ftp/Specs/archive/23_series/23.852/23852-100.zip.

"3rd Generation Partnership Project; Technical Specification Group Group Radio Access Network; Evolved Universal Terrestrial Radio Access (E-UTRA) and Evolved Universal Terrestrial Radio Access Network (E-UTRAN)"; Overall description; Stage 2, 3GPP 1536.300v11.0.0 Dec. 22, 2011, http://www.3gpp.org/ftp/Specs/archive/36_series/36.300/36300-b00.zip.

IEEE 802.11u-2011, IEEE Standard for information technology—Telecommunications and information exchange between systems—Local and metropolitan area networks—Specific requirements Part II: Wireless LAN Medium Access Control (MAC) and Physical Layer (PHY) specifications—Amendment 9: Interworking with External Networks, http://standards.ieee.org/getieee802/download/802.11u-2011.pdf.

"3rd Generation Partnership Project; Technical Specification Group Services and System Aspects; Architecture enhancements for non-3GPP accesses (Release 10)", 3GPP Standard; 3GPP TS 23.402, 3rd Generation Partnership Project (3GPP), Mobile Competence Centre; 650, Route des Lucioles; F-06921 Sophia-Antipolis Cedex; France, No. V10.2.0, Dec. 17, 2010 (Dec. 17, 2010), pp. 1-228, XP050462100.

"3rd Generation Partnership Project; Technical Specification Group Services and System Aspects; Circuit Switched (CS) fallback in Evolved Packet System (EPS); Stage 2 (Release 10)", 3GPP Standard; 3GPP TS 23.272, 3rd Generation Partnership Project (3GPP), Mobile Competence Centre; 650, Route Des Lucioles; F-06921 Sophia-Antipolis Cedex; France, No. V10.2.0, Dec. 17, 2010 (Dec. 17, 2010) p. 3.

Gundavelli S et al: "Proxy Mobile IPv6; rfc5213.txt", Proxy Mobile IPV6; RFC5213.TXT, Internet Engineering Task Force, IETF; Standard, Internet Society (ISOC) 4, Rue des Falaises CH-1205 Geneva, Switzerland, Aug. 1, 2008 (Aug. 1, 2008), XP015060252.

"3rd Generation Partnership Project; Technical Specification Group Services and System Aspects; Local IP Access and Selected IP Traffic Offload (LIPA-SIPTO) (Release 10)". 3GPP Standard; 3GPP TR 23.829. 3rd Generation Partnership Project (3GPP), Mobile Competence Centre; 650, Route des Lucioles; F-06921 Sophia-Antipolis Cedex; France, No. V10.0.0, Mar. 29, 2011 (Mar. 29, 2011), pp. 1-43, XP050476492.

Nec et al: "Enhancing requirements for Managed Remote Access", 3GPP Draft; S1-094014, 3rd Generation Partnership Project (3GPP), Mobile Competence Centre; 650, Route des Lucioles; F-06921 Sophia-Antipolis Cedex; France, No. Beijing; 20091116, Nov. 16, 2009 (Nov. 16, 2009), XP050395998.

International Search Report for Application No. PCT/JP2012/002023 dated Jul. 19, 2012.

* cited by examiner

[Fig. 1]
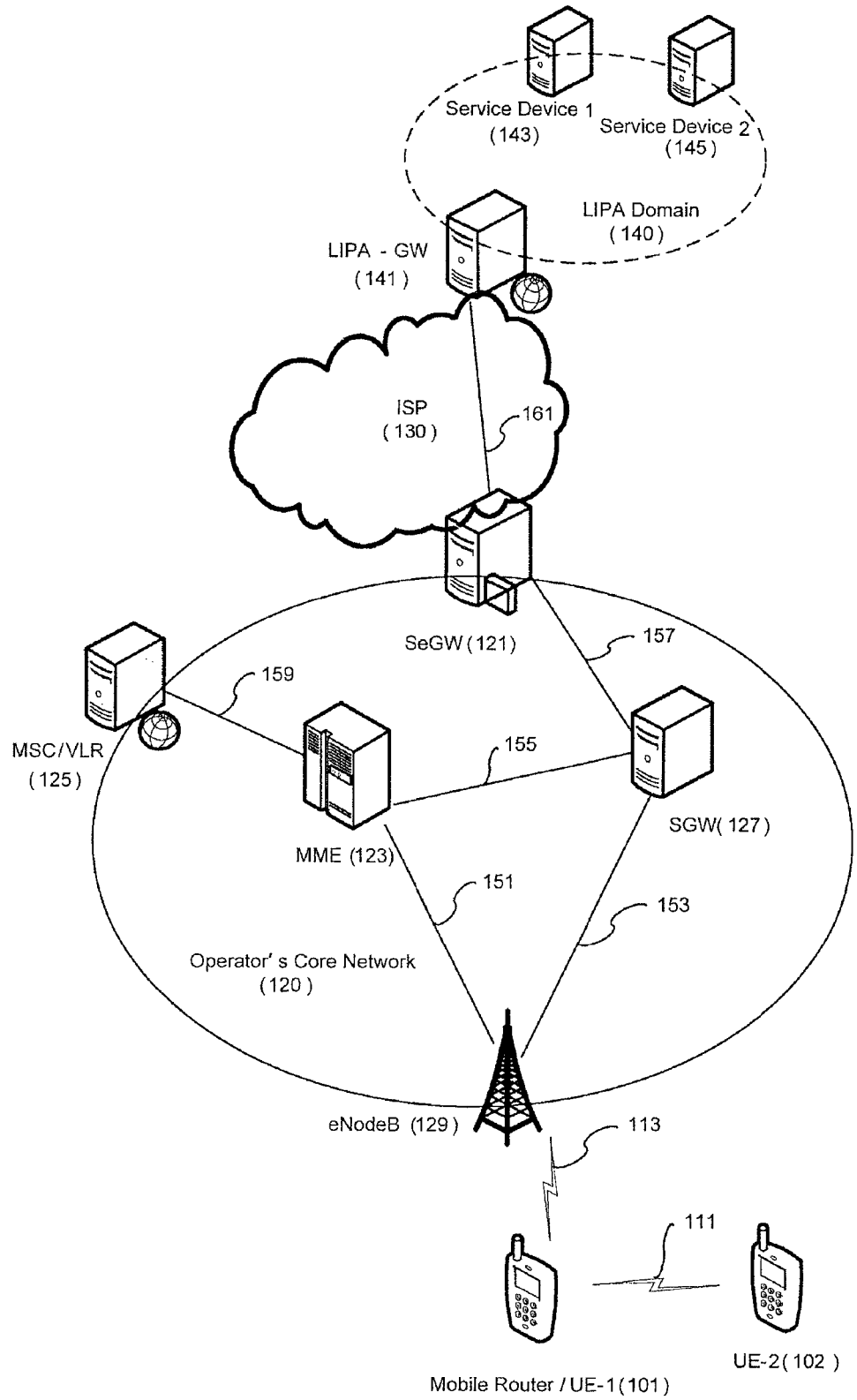

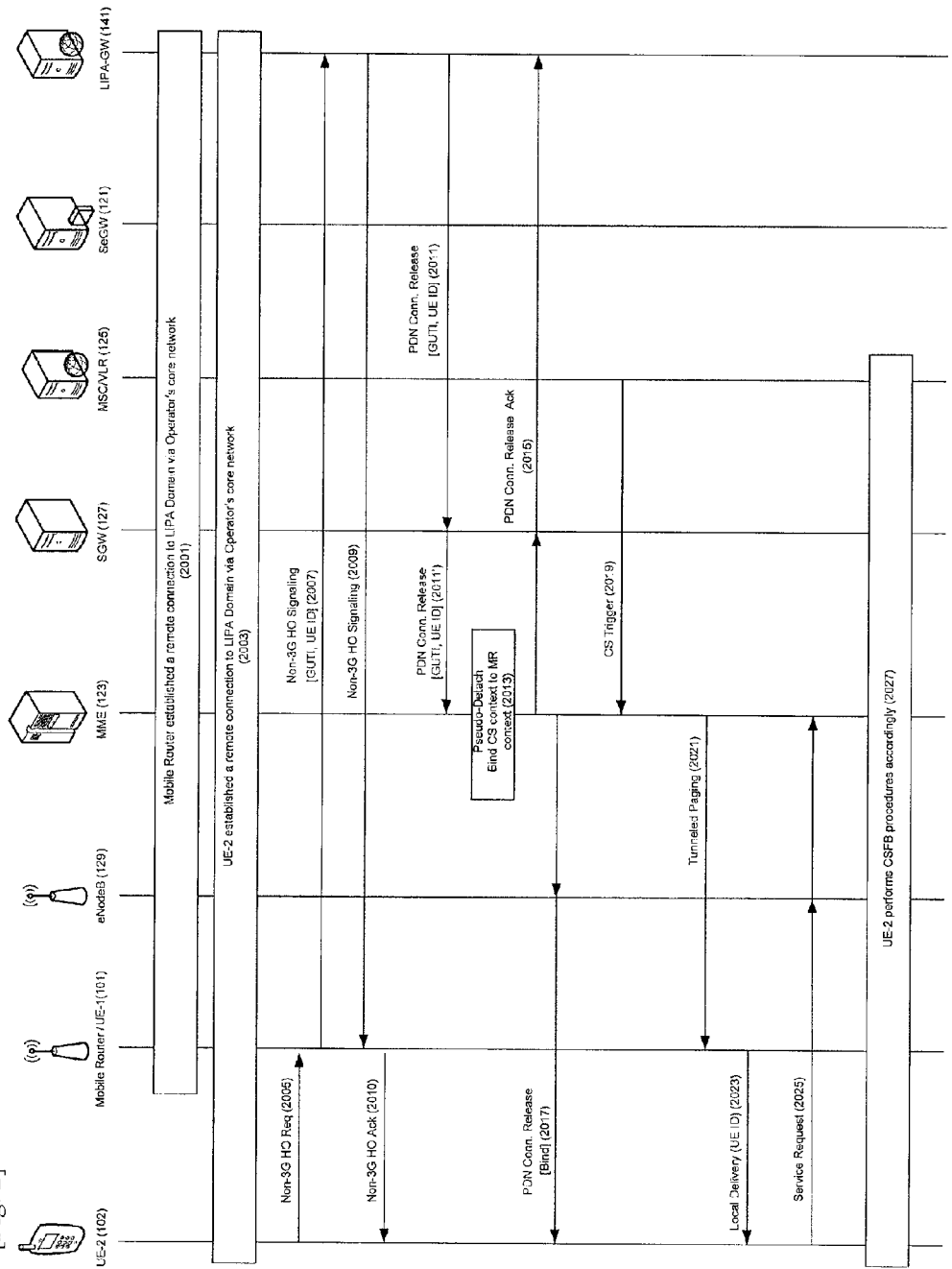
[Fig. 2]

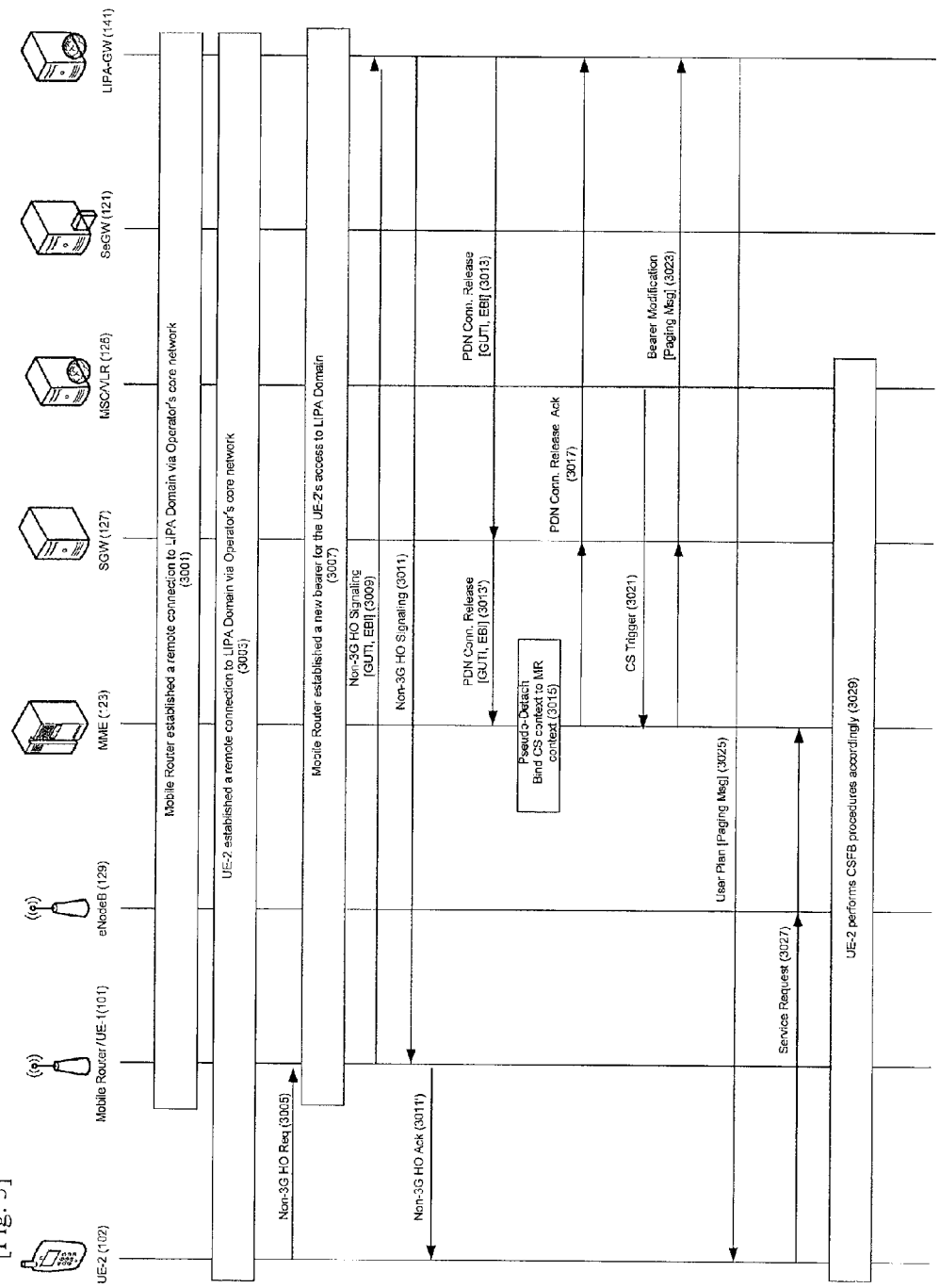
[Fig. 3]

[Fig. 4]
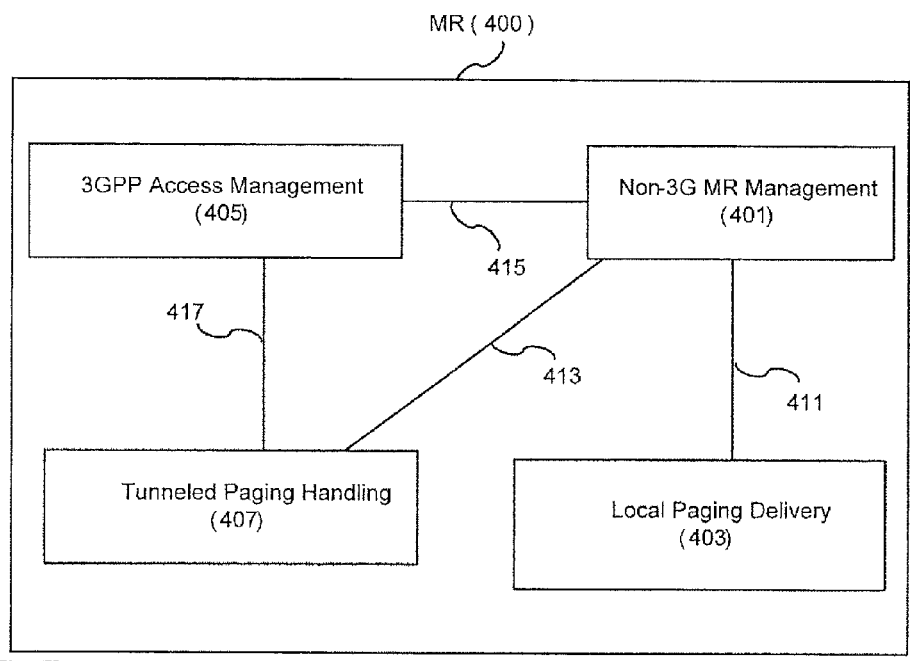
[Fig. 5]
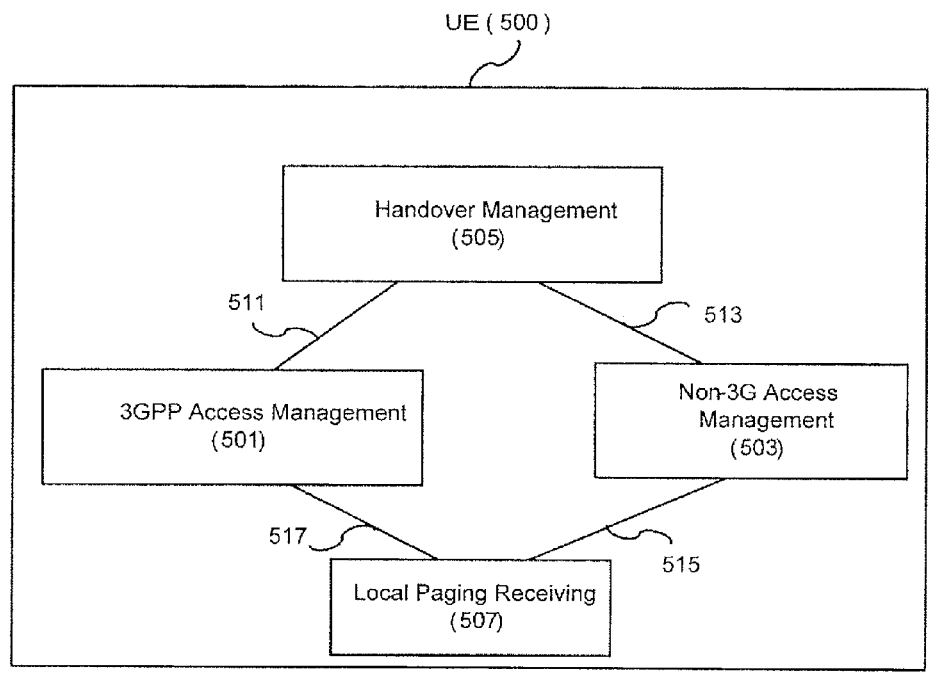

[Fig. 6]
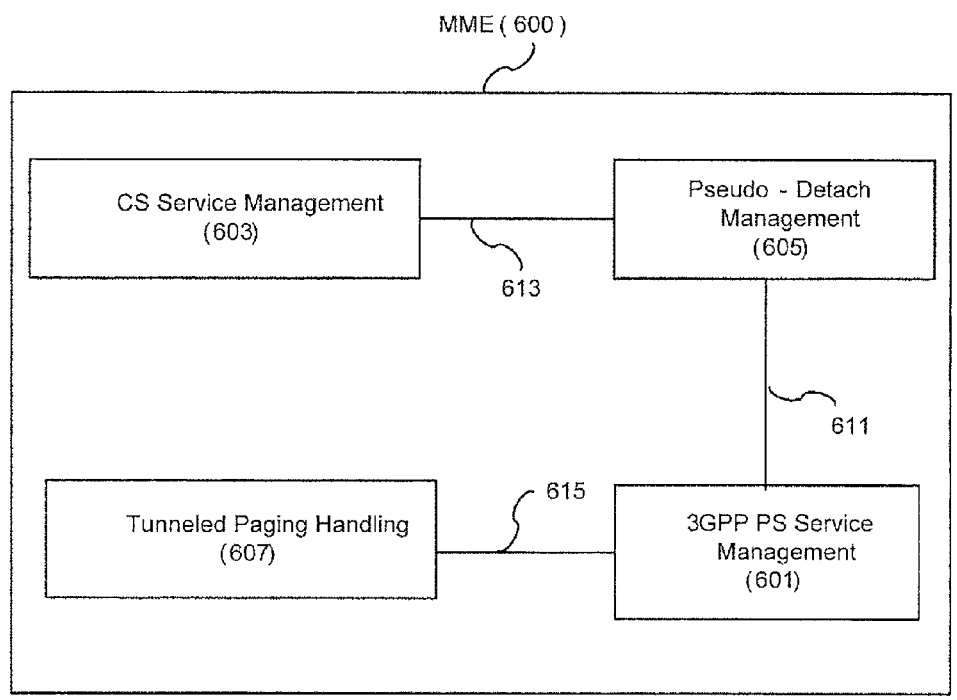
[Fig. 7]
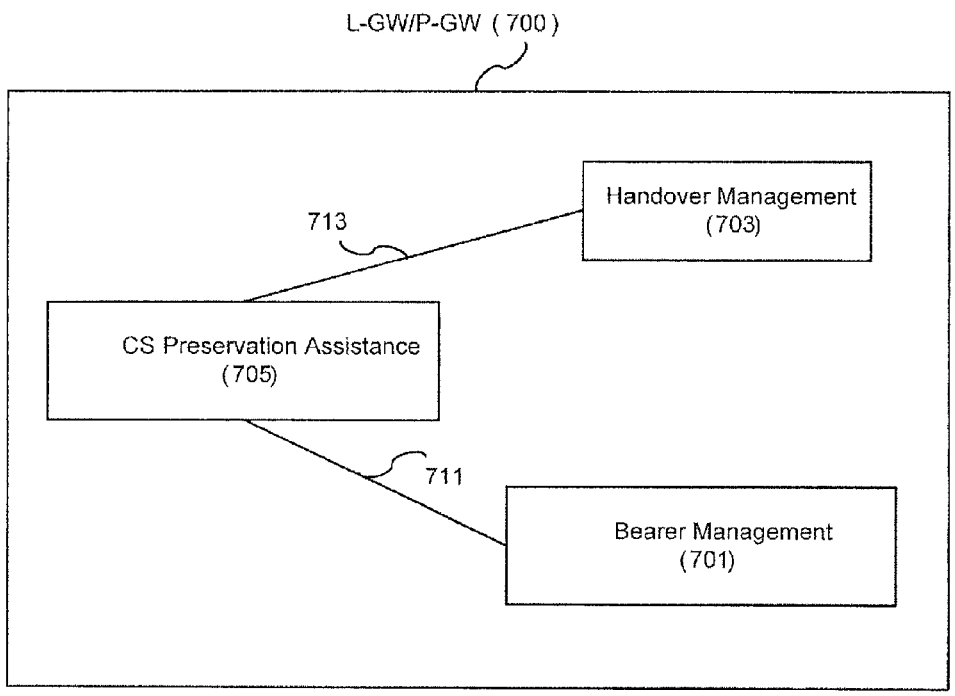

[Fig. 8]
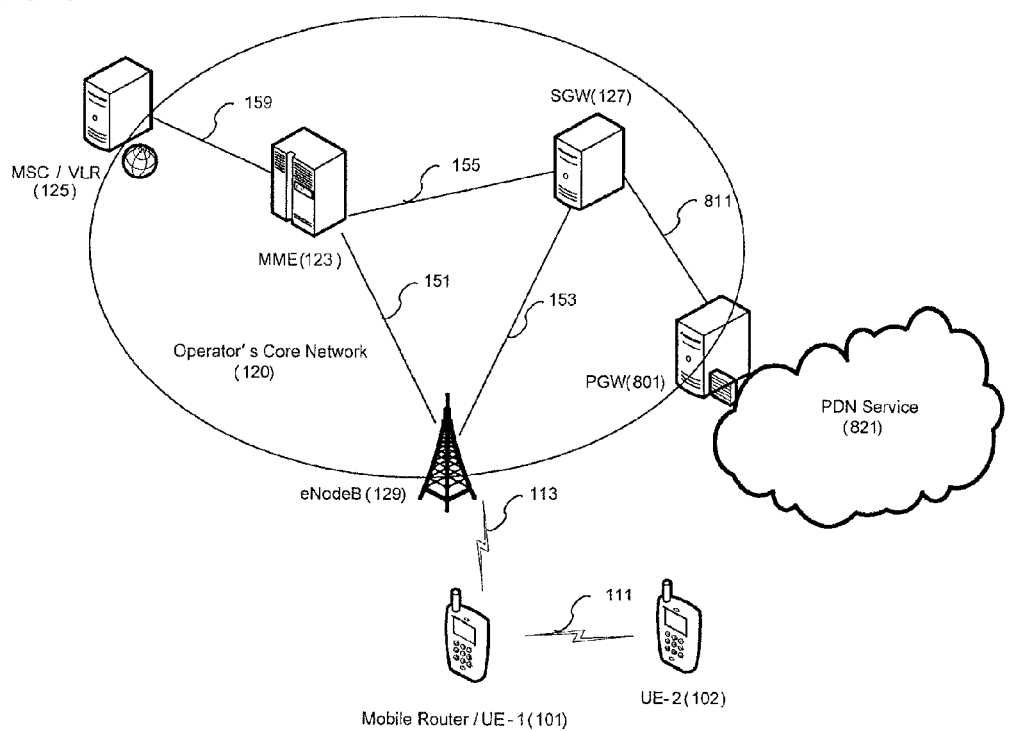

[Fig. 9]
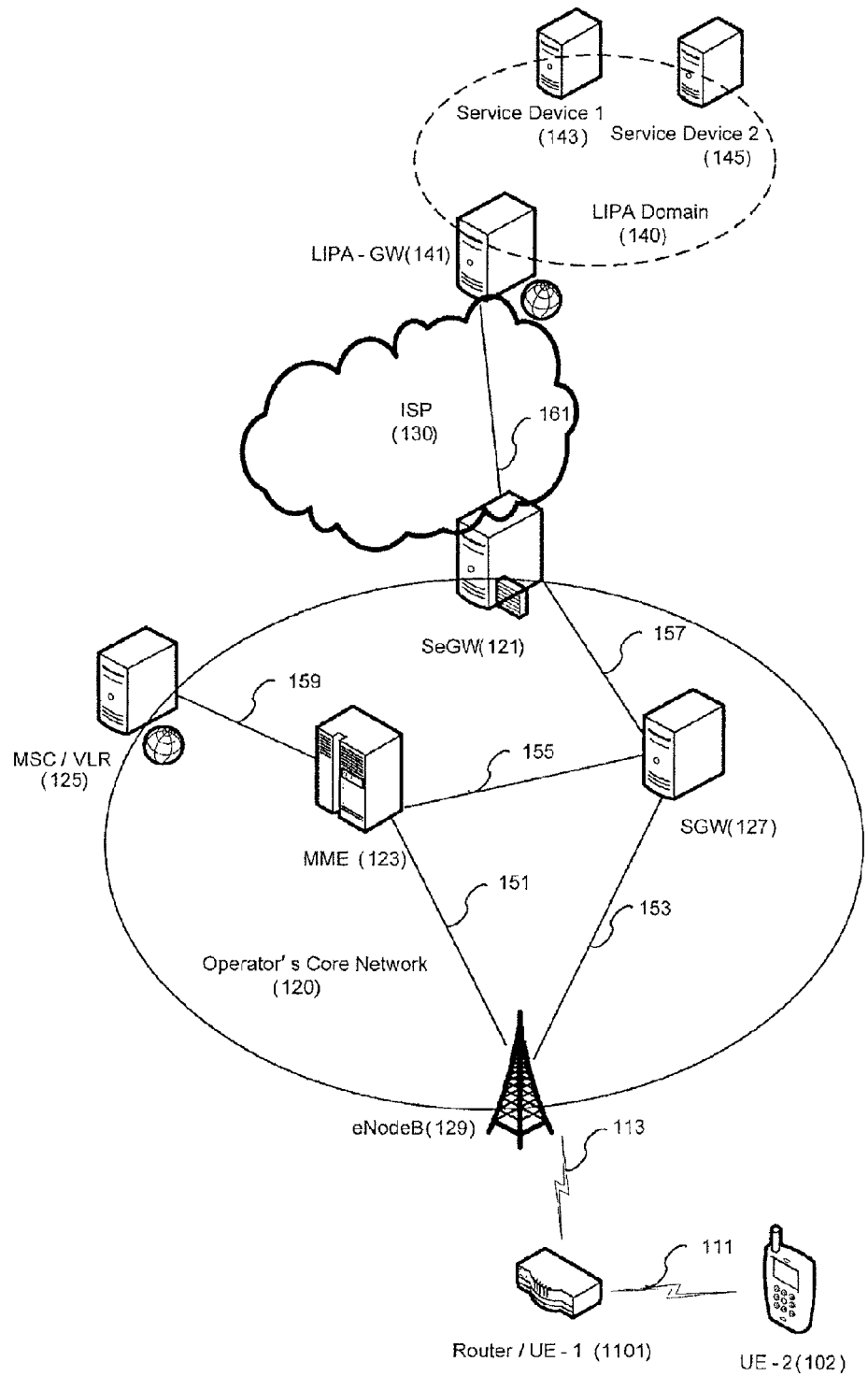

[Fig. 10]
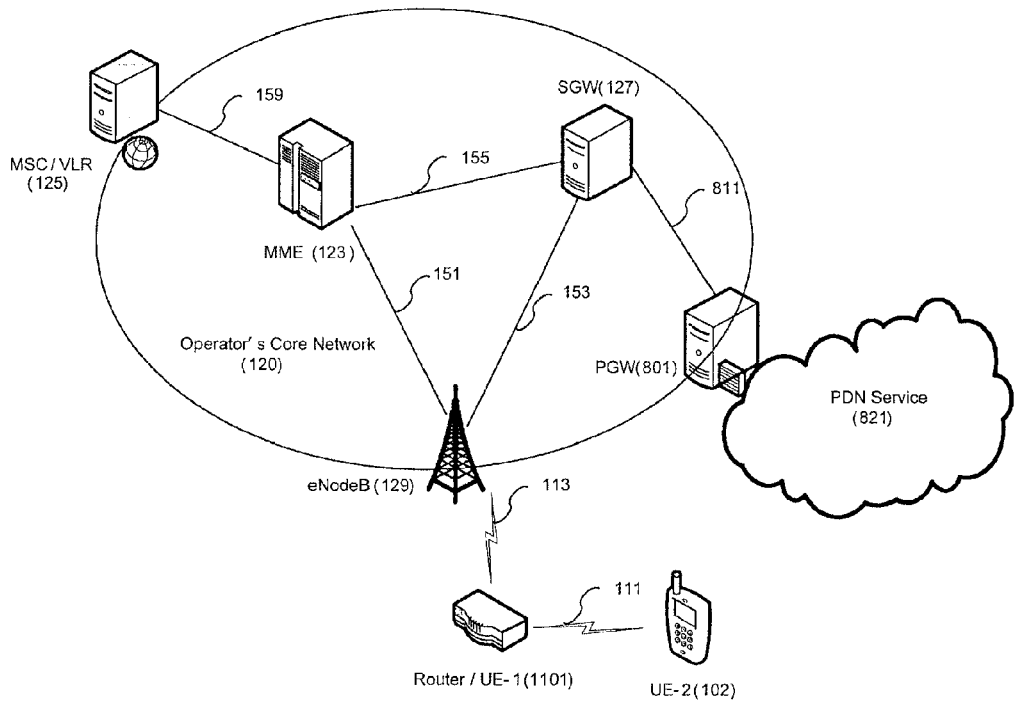
[Fig. 11]
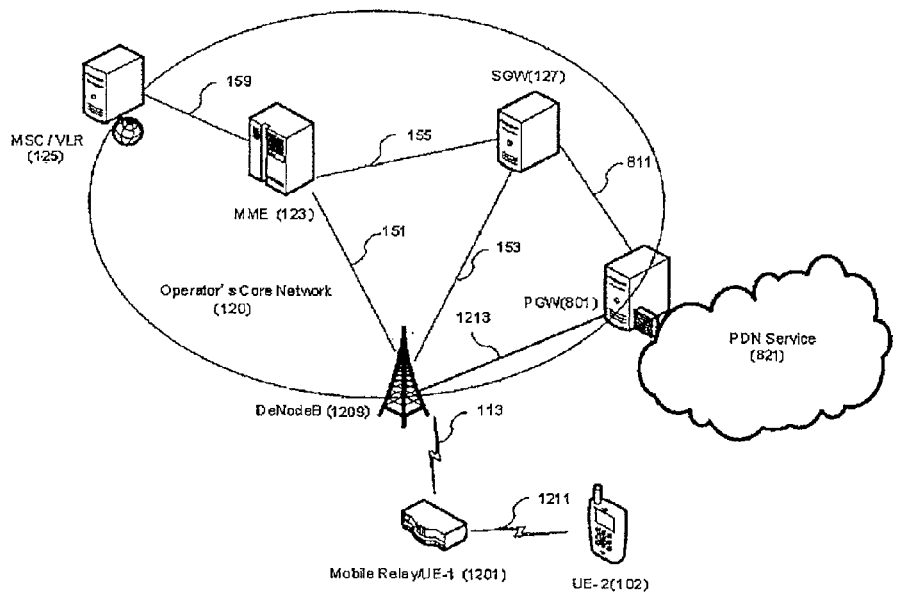

COMMUNICATION SYSTEM, MOBILE TERMINAL, ROUTER, AND MOBILITY MANAGEMENT ENTITY

TECHNICAL FIELD

This invention relates to data communications network. More specifically, it relates to the management for the local IP access in a mobile communication system.

BACKGROUND ART

With the introduction of consumer premises based access node using cellular communication technologies, e.g. Home Node B (HNB), Home eNode B (HeNB), Femto Cell base station, Atto Cell base station or home base station, 3GPP also created use cases for the Local IP Access (LIPA) and Selected IP Traffic Offloading (SIPTO) (NPL 1), where the a User Equipment (UE) is allowed to access a local network connected or near to the HNB/HeNB besides the mobile network operator's core network. For example, LIPA allows direct access to the home based network or general Internet without going through the operator's core network.

In certain cases, such connection will continue even if the UE moves away from the consumer premises. For example, a user may want to continue access to certain files or media contents when he left his home, or the user may want to remotely control certain devices in the home network. Such a remote access is termed Remote Local IP Access (RIPA).

In the RIPA case, the UE's traffic goes via the operator's core network. Depending on its location, the UE may be attached to the operator's core network via different access technologies, including 3GPP (cellular communication based) access network (or system) and non-3GPP (non-cellular communication based) access network (or system). The procedures for obtaining access through those accesses are defined in (NPL 1) and (NPL 2).

For example, if the UE is close to a Wireless Local Area Network (WLAN) that is deployed by the operator or supports interworking with the operator's core network, the UE may choose to establish a connection via the WLAN following the procedures defined in (NPL 2), and hands over the existing connections to the WLAN connections. This would allow the UE to enjoy higher bandwidth and cheaper rates. In addition, shifting the traffic to the WLAN access also allows the UE to save energies (battery) by turning its 3GPP access technology into IDLE mode or off.

In certain cases, the non-3GPP access point can be also mobile, for example, a Mobile Router, capable of cellular (e.g. 3GPP) communication and WLAN communication, installed on a train, vehicles, or car. In such case, the Mobile Router may also make use of 3GPP connections to obtain the backhaul connections to the operator's core network. In that case, the Mobile Router can aggregate several UE's connections over its 3GPP access.

CITATION LIST

Non-Patent Literature

[NPL 1] General Packet Radio Service (GPRS) enhancements for Evolved Universal Terrestrial Radio Access Network (E-UTRAN) access, 3GPP TS 23.401 V10.2.0 Release 10, 2010-12, http://www.3gpp.org/ftp/Specs/archive/23_series/23.401/23401-a20.zip

[NPL 2] Architecture enhancements for non-3GPP accesses, 3GPP TS 23.402 V10.2.0 Release 10, 2010-12, http://www.3gpp.org/ftp/Specs/archive/23_series/23.402/23402-a20.zip

[NPL 3] Circuit Switched (CS) fallback in Evolved Packet System (EPS), 3GPP TS23.272 V10.2.0 Release 10, 2010-12, http://www.3gpp.org/ftp/Specs/archive/23_series/23.272/23272-a20.zip

[NPL 4] Security of Home Node B (HNB)/Home evolved Node B (HeNB), 3GPP TS33.320 V10.2.0 Release 10, 2011-03, http://www.3gpp.org/ftp/Specs/archive/33_series/33.320/33320-a20.zip

[NPL 5] Proxy Mobile IPv6, IETF RFC 5213 http://www.ietf.org/rfc/rfc5213.txt

[NPL 6] Non-Access-Stratum (NAS) protocol for Evolved Packet System (EPS), 3GPP TS24.301 V10.1.0, Release 10, 2010-12 http://www.3gpp.org/ftp/Specs/archive/24_series/24.301/24301-a10.zip

[NPL 7] Study on S2a Mobility based on GTP & WLAN access to EPC, 3GPP TR23.852 v1.0.0 2011-12-16 http://www.3gpp.org/ftp/Specs/archive/23_series/23.852/23852-100.zip

[NPL 8] Evolved Universal Terrestrial Radio Access (E-UTRAN) and Evolved Universal Terrestrial Radio Access Network (E-UTRAN); Overall description; Stage 2, 3GPP TS36.300v11.0.0 2011-12-22 http://www.3gpp.org/ftp/Specs/archive/36_series/36.300/36300-b00.zip

[NPL 9] IEEE 802.11u-2011, IEEE Standard for information technology—Telecommunications and information exchange between systems—Local and metropolitan area networks—Specific requirements Part II: Wireless LAN Medium Access Control (MAC) and Physical Layer (PHY) specifications—Amendment 9: Interworking with External Networks, http://standards.ieee.org/getieee802/download/802.11u-2011.pdf

SUMMARY OF INVENTION

Technical Problem

According to the procedures defined in (NPL 2), when the UE performs the handover or transfers the PDN (Packet Data Network) connections to the non-3GPP access, the 3GPP access side will remove the corresponding connection which is established via 3GPP access. Therefore, when the UE transfers all its connections to the non-3GPP access, it would be detached (or released) from the 3GPP access.

However, in the 3GPP system, certain services can only be provided over the 3GPP CS (Circuit Switch) system, e.g. SMS (Short Message Service), LCS (LoCation Service), CS call (for voice and video), etc, and it may be triggered via 3GPP PS system when the UE establishes a connection to UMTS/GPRS PS system or Evolved Packet System (EPS), e.g. through CSFB (CS Fall Back, (NPL 3)) procedure. When the UE gets detached from the 3GPP access, it would lose the context in the operator's core network, e.g. SGSN/MME. In that case, the 3GPP system would not be able to page the UE, and therefore those services would not be provided at all for the UE after handover to non-3GPP access. In addition, the EPS is also not able to deliver SMS over the Non-Access Stratum (NAS), which can be crucial in supporting some services, e.g. machine type communication device trigger, Open Mobile Alliance—Device Management (OMA-DM), etc., in an area without CS coverage.

One possible approach to avoid this problem is for the UE to establish another PDN connection or PDP context over the 3GPP access (i.e. with EPS or UMTS/GPRS PS system), such that its context in SGSN/MME can be kept for paging. However, this connection serves only paging procedure, and would result in battery drain due to signaling required to maintain the 3GPP connections and UE's mobility, e.g. TAU (Tracking Area Update), cell reselection, cell scanning, etc.

Also, because of this additional PDN connection over the 3GPP access, additional system resources would be wasted. For example, the operator's core network needs to maintain the UE context, and therefore needs to process the required signaling messages. If there are groups of UEs moving together, e.g. on the train, this may result in some signaling storm. Obvious there is a need for better solution for the problems.

Solution to Problem

To achieve the above-described object, the present invention provides communication system, mobile terminal, router, and mobility management entity.

Accordingly, the present invention provides for a communication system. The communication system comprising a mobile terminal which is connected to a predetermined network through a base station to use a predetermined service, the mobile terminal transmitting a handover request signaling (the Non-3G Handover Request in FIG. 2) for handover to a router being a new connection destination in a case where the mobile terminal connects to the predetermined network through the router by handover; the router which transmits an identification information signaling (Non-3G Handover Signaling in FIG. 2) to a gateway of a home network of the mobile terminal on the basis of the handover request signaling, the identification information signaling including identification information of the router and identification information of the mobile terminal; and a mobility management entity which, on the basis of a release request signaling (PDN Connection Release message in FIG. 2) transmitted from the gateway, binds a context of the mobile terminal to a context of the router and performs a process to release connection of the mobile terminal before the handover, the release request signaling including the identification information of the router and the identification information of the mobile terminal and requesting the release of the connection of the mobile terminal before the handover.

In one preferred embodiment of the present invention, the mobility management entity determines whether or not to bind the contexts, on the basis of location information of the mobile terminal and the router.

In another preferred embodiment of the present invention, before transmitting the handover request signaling, the mobile terminal confirms the router has a function of paging proxy on the basis of the identification information of the router, and then transmits signaling for updating the location information of the mobile terminal to the mobility management entity.

In another preferred embodiment of the present invention, after receiving the handover request signaling, the router determines whether or not the mobile terminal belongs to a predetermined group to which the router belongs, and transmits the identification information signaling when the router determines that the mobile terminal belongs to the predetermined group.

In another preferred embodiment of the present invention, in a case where the predetermined network is a 3GPP network, the mobility management entity identifies the router by using the bound context of the router to the context of the mobile terminal upon receipt of a trigger of the predetermined service for the mobile terminal, and transmits a signaling to the mobile terminal through a 3GPP signaling bearer between the mobility management entity and the router, the signaling comprising paging of the predetermined service.

In another preferred embodiment of the present invention, in a case where the signaling comprising the paging of the predetermined service, the router pages the mobile terminal by using the paging of the predetermined service.

In another preferred embodiment of the present invention, in a case where the signaling comprising the paging of the predetermined service and where there is a specific data bearer between the router and the gateway for the mobile terminal, the router removes the data bearer or lowers a quality of service in the data bearer.

In addition, the present invention provides for a mobile terminal. The mobile terminal which is connected to a predetermined network through a base station to use a predetermined service, the mobile terminal connects to the predetermined network through a router being a new connection destination by handover, the mobile terminal comprising a determining means for determining, before the handover is performed, whether or not the router has a function of paging proxy on the basis of identification information of the router; a transmitting means for transmitting a signaling for updating location information of the mobile terminal to a mobility management entity, when the router has the function of the paging proxy is determined; and a signaling generating means for generating a handover request signaling for the handover to the router, wherein the transmitting means transmits the generated handover request signaling to the router.

In addition, the present invention provides for a router. The router which is a new connection destination for a mobile terminal connected to a predetermined network through a base station to use a predetermined service, the mobile terminal connects to the predetermined network through the router by handover, the router comprising a receiving means for receiving a handover request signaling for the handover from the mobile terminal; a signaling generating means for generating an identification information signaling including identification information of the router and identification information of the mobile terminal, on the basis of the received handover request signaling; and a transmitting means for transmitting the generated identification information signaling to a gateway of a home network of the mobile terminal.

In one preferred embodiment of the present invention, further comprising a determining means for determining, after the handover request signaling is received, whether or not the mobile terminal belongs to a predetermined group to which the router belongs, wherein the transmitting means transmits the identification information signaling when the mobile terminal belongs to the predetermined group is determined.

In another preferred embodiment of the present invention, further comprising a processing means for, in a case where signaling transmitted from a mobility management entity and comprising paging of the predetermined service is received through the receiving means, paging the mobile terminal by using the paging of the predetermined service.

In another preferred embodiment of the present invention, further comprising a processing means for, in a case where signaling transmitted from a mobility management entity and comprising paging of the predetermined service is received through the receiving means, and where there is a specific data bearer between the router and the gateway for the mobile terminal, removing the data bearer or lowering a quality of service in the data bearer.

In addition, the present invention provides for a mobility management entity. The mobility management entity which manages mobility of a mobile terminal connected to a predetermined network through a base station to use a predetermined service, the mobile terminal connects to the predetermined network through a router being a new connection destination by handover, the mobility management entity comprising a receiving means for receiving a release request signaling transmitted from a gateway of a home network of the mobile terminal, the release request signaling including identification information of the router and identification information of the mobile terminal and requesting release of connection of the mobile terminal before the handover; a binding means for binding a context of the mobile terminal to a context of the router on the basis of the received release request signaling; and a processing means for performing a process to release the connection of the mobile terminal before the handover.

In one preferred embodiment of the present invention, the binding means determines whether or not to bind the contexts, on the basis of location information of the mobile terminal and the router.

In another preferred embodiment of the present invention, further comprising a signaling generating means for generating a signaling in a case where the predetermined network is a 3GPP network and where the receiving means receives a trigger of the predetermined service for the mobile terminal, the signaling comprising paging of the predetermined service; and a transmitting means for identifying the router by using the bound context of the router to the context of the mobile terminal, and transmitting the generated signaling to the mobile terminal through a 3GPP signaling bearer between the mobility management entity and the router.

Advantageous Effects of Invention

The invention has the advantage of allowing the UE to continue enjoying (receiving) the service that is exclusive for the 3G connections, e.g. SMS, CSFB, LCS, etc, over the non-3G connections.

BRIEF DESCRIPTION OF DRAWINGS

FIG. 1 is an example network architecture that supports the present invention;

FIG. 2 is an example operation sequence of the present invention;

FIG. 3 is an alternative example operation sequence of the present invention;

FIG. 4 is an example architecture of the Mobile Router for the present invention;

FIG. 5 is an example architecture of the Mobile Terminal for the present invention;

FIG. 6 is an example architecture of the Mobility Management Entity for the present invention;

FIG. 7 is an example architecture of the L-GW or P-GW for the present invention;

FIG. 8 is an alternative network architecture that supports the present invention;

FIG. 9 is an alternative network architecture that supports the present invention;

FIG. 10 is an alternative network architecture that supports the present invention;

FIG. 11 is an alternative network architecture that supports the present invention;

DESCRIPTION OF EMBODIMENTS

In the following description, for the purpose of explanation, specific numbers, times, structures, protocols, and other parameters are set forth in order to provide a thorough understanding of the present invention. However, it will be apparent to anyone skilled in the art that the present invention may be practiced without these specific details.

In the following description, for the purpose of explanation, the 3GPP Long Term Evolution (LTE) and Evolved Packet System (EPS) are used as example 3GPP access technology and network architecture. Also WLAN or WiFi are used as example non-3GPP access technology. However, it will be apparent to anyone skilled in the art that the present invention may be practiced with other access technology and network architecture under the same principle, e.g. GSM, GPRS, UMTS, WiMAX, LTE Advanced, Bluetooth, Zigbee, Ethernet, etc.

In the description, LIPA is used as the example. However, it is obvious to anyone skilled in the art that the present invention can also be applied to SIPTO without major change to the general principles. Further beyond, the present invention can also be applied to a generic case with neither LIPA nor SIPTO.

Embodiment 1

With reference to FIG. 1, an example network configuration that the present invention can apply is illustrated.

As shown in the figure, an eNodeB (129) is providing 3GPP connections to the Operator's Core Network (120) and 3GPP access service to UEs, e.g. UE-1 (101) and UE-2 (102) in the figure. The eNodeB (129) is connected to the core network entities, Mobility Management Entity (MME) (123) and Serving Gateway (SGW) (127) via interface 151 and 153 respectively. The SGW (127) and MME (123) are connected via interface 155. In case the Operator's Core Network (120) uses the 3GPP SAE architecture as defined in (NPL 1), interface 151, 153, and 155 are corresponding to the S1-MME, S1-U, and S-11 interfaces.

The MME (123) is connected to a Mobile Switching Center (MSC)/Visitor Local Register (VLR) (125) via interface 159. The MSC/VLR are the entities from the CS Domain. For example, the interface 159 can be the SGs interface if the CSFB architecture defined in (NPL 3) is used.

The SGW (127) may be further connected to a Security Gateway (SeGW) (121) via interface 157. The SeGW (121) is a gateway that allows user premises entities, e.g. Local IP Access Gateway (LIPA-GW) (141), to connect into the Operator's Core Network (120). This connection may go through some third party network, e.g. the ISP Network (130), and therefore require some additional security configurations. For example, the connection between the LIPA-GW (141) and SeGW (121) may need to make use of IP Security (IPSec) for protection, and the Internet Key Exchange protocol version 2 (IKEv2) may be used for setting up the secure tunnel over 161. An example SeGW function is defined in (NPL 4).

The LIPA-GW (141) is an entry point towards the Local IP Access Domain (140), which could be offering connections to Service Device 1 (143) and Service Device 2 (145). The LIPA-GW (141) has some signaling connection with the SGW (127). This signaling connection goes via the SeGW (121) transparently. A user plane data connection can be also established between LIPA-GW (141) and SGW (121) when necessary. LIPA-GW can be act as a PGW (PDN GW) in certain extend.

It is obvious to anyone skilled in the art that the figure only presented the bare minimum entities that are related to the solution. There would be much more network nodes in the actual system. It is also possible that the Local IP Access Domain (140) is provided by the operators, and there is no involvement of the ISP (130), for example in a Selection IP Traffic Offload (SIPTO) like case.

As shown in the figure, there are two types of mobile terminals in the network, UE-1 (101) and UE-2 (102). Both of them can support 3GPP access. The UE-1 (101) has an additional function of a Mobile Router that can provide connections to other terminals using non-3GPP access technology, e.g. WLAN. UE-1 (101) connects to the Operator's Core Network via the 3GPP access, e.g. through the eNodeB (129) with link 113. At the same time, the UE-1 (101) is capable of providing non-3GPP based access to other terminals, e.g. UE-2 (102) through link 111. An example of the UE-1 (101) could be the mobile router installed in a train that can use the cellular services, e.g. UMTS or LTE to connect to the operator's core network, and can allow other mobile terminals to access the operator's core network via WLAN link which the UE-1 (101) provides. When providing the service to other terminals, UE-1 (101) may act as a local mobility anchor (function or node) such as the Trusted Non-3GPP Access function, e.g. the MAG (Mobility Access Gateway), or Untrusted Non-3GPP Access function, e.g. PDG (Packet Data Gateway) or ePDG (enhanced PDG) as defined in (NPL 2). In other cases, the UE-1 (101) can be a normal mobile phone that is providing tethering service to other nearby mobile terminals through WLAN or Bluetooth connections. Alternatively, the UE-1 (101) could be a 3GPP mobile terminal installed in a car that shares its 3GPP connections with other mobile devices in the car via WLAN, Bluetooth or other in-car or personal/body area communication connections which the UE-1 (101) provides to the other mobile devices.

The UE-2 (102) is a 3GPP mobile terminal that supports both 3GPP access and non-3GPP access, and can connect UE-1 (101) via the non-3GPP access link such as WLAN where the UE-1 (101) is an access point for the access. For example, UE-2 (102) can be a mobile phone with a 3GPP interface and more than one non-3GPP interface such as WLAN interface, USB, WiMAX, or Bluetooth.

UE-2 (102) is accessing a service provided by the LIPA Domain (140) remotely (i.e. RIPA to LIPA Domain (140)). For example, UE-2 (102) may have established a 3GPP connection via the eNodeB (129), and is accessing the Service Device 1 (143) through the SGW (127) and LIPA-GW (141).

At the same time, the UE-2 (102) is also registered with the CS Domain of the Operator's Core Network, i.e. an interface between MSC/VLR (125) and MME (123) is established according to (NPL 3). This allows the MME (123) to page the UE-2 (102) accordingly when triggers are sent from MSC/VLR (125), or there are SMS to be delivered to UE-2 (102).

When the UE-2 (102) goes near UE-1 (101), it may discover the non-3GPP connections provided by UE-1 (101), for example by scanning the radio signals, based on GPS information, based on 3GPP location or cell information, or manual configuration. The UE-2 (102) would decide to handover its PDN connections (or PDP contexts) to the non-3GPP access. This could be due to charging rate difference, power consumption considerations, operator policy, or user manual configurations.

For example, the LIPA Domain (140) would generate some broadcast or multicast traffic, e.g. for device discovery like UPnP, DLNA, etc. When the UE-2 (102) is using 3GPP access, such traffic may trigger the system to bring the UE-2 (102) into CONNECTED mode for the delivery. If the UE-2 (102) was in IDLE mode, paging will be used to bring the UE-2 (102) into CONNECTED mode first. As these traffic data are normally periodic, it means the UE-2 (102) may end up in CONNECTED mode most of the time. Therefore, the power consumption of the UE-2 (102) is high. It also creates additional signaling load to the network, e.g. for paging and IDLE mode to CONNECTED mode transition.

Therefore, if the UE-2 (102) can transfer the remote access to the LIPA Domain (140) to the non-3GPP access, it may be able to save some power. For example, a WLAN based non-3GPP access does not require any additional control signaling to deliver downlink data, and the terminal can go directly to sleep mode immediately after receiving the data.

(Pseudo-Detach of UE and Binding to MR's EMM Context)

With reference to FIG. 2, an example operation sequence of the present invention over the architecture shown in FIG. 1 is illustrated.

As shown in the figure, the UE-1 (101) establishes a remote LIPA connection (i.e. RIPA connection) towards the LIPA Domain (140) via Operator's Core Network (120) at step 2001. This can be achieved by following the operation procedures defined in (NPL 1), with certain enhancement at the P-GW selection step. For example, the UE-1 (101) provides a Remote LIPA APN in its PDN Connectivity Request to the MME (123), and the MME (123) based on its subscription information and the current location of the UE-1 (101) decides whether a Remote LIPA (RIPA) connection can be authorized. If the authorization is successful, the MME (123) chooses the LIPA-GW (141) according to the Remote LIPA APN requested, the UE-1 (101)'s subscription information, and other information like the CSG subscription, load status, etc. The LIPA-GW (141) performs necessary procedures as a P-GW defined in (NPL 1).

It should be noted that this RIPA Connection may also be a result of handover from the Femto cell to the macro network. For example, the UE-1 (101) may have established a LIPA connection under a Closed Subscriber Group (CSG) cell, following the steps in (NPL 1). When the UE-1 (101) moves out of the CSG cell coverage, handover is performed for all its PDN connections. The network, e.g. the CSG cell base station (i.e. H(e)NB) and the MME (123), authorized a RIPA access based on UE-1 (101) subscription information, operator's policy, network configuration, and the new serving cell information, etc.

For example, if the UE-1 (101) is a 3GPP UE installed on a car, e.g. Electrical Vehicle (EV), of the family, it may have established LIPA Connection when the EV is parked in the garage under the coverage of the H(e)NB in the house. When the user drives the EV out, the connections would be handovered to the macro network, and the service to the home network, e.g. LIPA Domain (140) can be maintained via RIPA connection.

It is obvious to anyone skilled in the art that the RIPA connection may be also the SIPTO connection as defined in (NPL 1), where the UE outside home accesses Internet via RIPA connection to LIPA Domain. It does not affect the general principle of the present invention.

As shown in the figure, the UE-2 (102) also have a RIPA connection established via the Operator's Core Network (120), as indicated in step 2003. The establish procedure is similar to that of the UE-1 (101), and this RIPA connection may also be a result of outbound handover of a LIPA connection.

It is obvious to anyone skilled in the art that there is no time relationship between the step 2001 and 2003. They may happen in parallel, or in any other sequence. The step 2001 may even happen after the UE-2 (102) connected to the MR/UE-1 (101) and requested for handover in step 2005.

When the UE-1 (101) established the RIPA connection, it may also turn on its function of the Mobile Router (MR), which provides non-3GPP access. In this case, it would announce the availability of a connection to the LIPA Domain (140). For example, if the MR is capable of providing WLAN access through IEEE802.11 technology, it may announce the LIPA Domain (140) ID, CSG ID, or the RIPA APN in the Beacon message. Or, it may provide such information in other advertisement elements for other WLAN terminals to probe, e.g. using the IEEE802.11u technology or the mechanisms specified in Hotspot 2.0. When the UE-2 (102) goes close to the Mobile Router/UE-1 (101), it may obtain the announced information by listening to the Broadcasted message, or by querying the MR (101). It is also possible that the UE-2 (102) is configured with an identity of the UE-1 (101), e.g. the WLAN SSID or HESSID, or a fingerprint of the specific location, and turns on the non-3GPP radio to search for the MR/UE-1 (101) with the special function described in this application, such that UE-2 (102) can easily identify the target of non-3GPP access with capability of the described invention, and reduce time and also erroneous in setting up the access.

Another alternative is that the Operator's Core Network (120) provides certain policies to the UE-2 (102) based on its location and connection types, e.g. some policy rules through ANDSF function defined in (NPL 2). In this case, the UE-2 (102) would base on the conditions specified in the policy rules to locate and find MR/UE-1 (101). This allows fully automated operation based on operator's preference. It is also possible that the policy rules provide specific classification of the flows or applications, such that only when those applications and flows are present, the UE-2 (102) would initiate the handover towards the non-3GPP access. For example, the policy may indicate that only the video streaming or access to the youtube sites should be handovered to the non-3GPP access. Therefore, the UE-2 (102) would then try to initiate the establishment of the non-3GPP access or start the handover when detected the presence of the non-3GPP access offered by MR/UE-1 (101). It is also possible that the UE-2 (102) identifies the MR/UE-1 (101) based on user input. For example, if the user enters a car or a train, he/she may manually starts to search for the non-3GPP access. This allows the user to override some pre-settings, such that the desired user experience can be offered. For example, the user needs to urgently download some information, and he/she may decide to use a non-3GPP access that offers faster speed, even though the non-3GPP access is not a preferred access or at extra cost.

The UE-2 (102) after identified the MR/UE-1 (101) may decide to connect to it via the provided non-3GPP access and handover the existing PDN connections from 3GPP access to the non-3GPP access. The UE-2 (102) does this by sending a Non-3G Handover Request message to the MR/UE-1 (101) using the non-3GPP access specific methods, as indicated in step 2005.

Depends on the deployment scenarios, the MR/UE-1 (101) can be considered a trusted or untrusted non-3GPP access to the Operator's Core Network (120). This decides if the MR/UE-1 (101) performs the function of a MAG Router, a PDG or an ePDG as specified in (NPL 2). However, this difference does not affect the general principle of the present invention.

In case the MR/UE-1 (101) is treated as the trusted non-3GPP access, the Non-3G Handover Request (2005) can be an access specific Layer 3 Attach Trigger, e.g. a DHCP request message, a Router Solicitation message, or a local signaling message based on IP. In case the MR/UE-1 (101) is treated as the untrusted non-3GPP access, the Non-3G Handover Request (2005) can be part of the IKEv2 procedure that is required between the UE-2 (102) and the ePDG function in MR/UE-1 (101).

Authentication or authorization of UE-2 (102) process may happen in the due process of connecting to the MR/UE-1 (101). This can be achieved by following the steps as specified in (NPL 2). In order to achieve this, the MR/UE-1 (101) would need to have access to the AAA Server or AAA Proxy in the Operator's Core Network (120). This can be easily achieved by allocating some special AAA Proxy to the MR/UE-1 (101) when it connected to the Operator's Core Network (120) based on its subscription information. For example, the MR/UE-1 (101) may request such a connection in the PCO element of the PDN Connectivity Request. The P-GW (e.g. LIPA-GW 141) of MR/UE-1 (101) may setup special connections towards an AAA Proxy based on the PCO information and system authorization.

After received the Non-3G Handover Request (2005), the MR/UE-1 (101) would send the Non-3G Handover Signaling towards the LIPA-GW (141) to switch UE-2 (102)'s RIPA connections to non-3GPP access. In case Proxy MIP (PMIP) (NPL 5) is used in the system for managing the mobility for UE-2 (102), the Non-3G Handover Signaling (2007) could be the Proxy Binding Update message.

The MR/UE-1 (101) at this step may judge that the UE-2 (102) would like to preserve its CS service or the UE-2 (102) is required to preserve CS service over Non-3GPP access. This may be done through the special indication in the Non-3G Handover Request (2005), some preconfigured Token that was provisioned on both UE-2 (102) and UE-1 (101). Otherwise, the MR/UE-1 (101) may take subscription or preconfigured data for UE-2 (102) into account for its decision. For example, the MR/UE-1 (101) may indicate to the UE-2 (102) over the non-3GPP access, e.g. the Beacon message, or special element in the Association Response message, or as part of the lower layer authentication and authorization process, that it supports the CS service preservation. In turn, the UE-2 (102) may include a special indication or Token in the Non-3G Handover Request (2005). This Token may be obtained by the UE-2 (102) through previous signaling to the Operator's Core Network (120), e.g. in the response from the MME (123), or from the ANDSF policy rules, or from the LIPA-GW (141). Comparing to performing CS service preservation by default, such configuration negotiation between MR/UE-1 (101) and UE-2 (102) allows the MR/UE-1 (101) and the core network to avoid wasting resources unnecessarily, as some mobile terminals may not need to preserve the CS Services or does not have any CS services supported previously.

When the MR/UE-1 (101) decides that the UE-2 (102) wants or is required to preserve its CS services, the MR/UE-1 (101) would include additional information in the Non-3G Handover Signaling messages. For example, the MR/UE-1 (101) would include its identifier in the 3GPP network such as a temporary ID like GUTI, TMSI, etc. or a permanent ID like IMSI, etc. and a Local UE Identification to identify the UE-2 (102) in the WLAN access (non-3GPP access), and/or the Token in the message to the LIPA-GW (141).

The Local UE Identification can be of different forms. For example, it can be the UE-2's IMSI, TMSI (or GUTI) or a MN-NAI, UE-2's WLAN MAC address, or a local identifier allocated by the MR/UE-1 (101) to identify the UE-2 (102). The local identifier could be for example, the local IP address allocated to UE-2, terminal's ID used in DHCP exchanges, or the IDs used in the UPnP or DLNA discoveries, etc.

Once the LIPA-GW (141) receives the message, it would understand that UE-2 (102) would like or is required to preserve its CS service even though the connections are to be transferred to the non-3GPP access. Special actions would be taken by the LIPA-GW (141) in the further signaling to handle the connection.

The LIPA-GW (141) would respond to the MR/UE-1 (101) with a Non-3G Handover Signaling Response (2009). In case PMIP is used, this message would be the Proxy Binding Ack, which carries the IP address allocated to the UE-2 (102). This message will trigger the MR/UE-1 (101) to signal accordingly to the UE-2 (102) in the Non-3G Handover Acknowledgement (2010). These messages are according to the (NPL 2). Optionally, the LIPA-GW may indicate in the message 2009 that the CS service preservation is accepted or rejected. Such information may be also forwarded to the UE-2 (102) by the MR/UE-1 (101) in message 2010.

After receiving the Non-3G Handover Ack (2010), the UE-2 (102) would know if its handover of PDN connections to the non-3GPP access via MR/UE-1 (101) is successful, and the CS service preservation is done if the UE-2 requested the preservation. If the process is successful, the UE-2 (102) no longer needs the 3GPP access, and can turn it off when suitable. It should be noted that the indication in the response may also indicate that the UE-2 (102) should hold on the connection on 3GPP access for further signaling from the network for confirmation. In that case, the UE-2 (102) would have to keep the 3GPP connection first, e.g. until signaling in step 2017 indicates that the connection can be torn down.

As the LIPA-GW (141) accepted to preserve the CS service for the UE-2 (102) over the non-3GPP access, it would issue a special PDN Connection Release message towards the MME (123) via the SGW (127), as indicated in step 2011 and 2011'. In this message, the LIPA-GW (141) would include information including the MR/UE-1 (101)'s ID (e.g. GUTI), the UE-2's Local Identification, and/or the Token, that the LIPA-GW (141) received in Non-3G Handover Signaling (2007) with necessary processing.

Once received such PDN Connection Release message, the MME (123) would check if the CS service preservation can be authorized based on the information, e.g. the UE-2 (102)'s subscription, MR/UE-1 (101)'s subscription, the APN, the Token information, the network policies, etc.

If the MME (123) authorized the CS service preservation, the MME (123) would perform a pseudo-Detach (or limited-Detach, PS-Only-Detach, etc.) operation, as indicated in step 2013. The pseudo-Detach allows the MME (123) to remove the 3GPP EPS bearers or PDP contexts and corresponding context for the UE-2 (102), but preserve its CS related interfaces, e.g. SGs, and associate it to MR/UE-1 (101)'s mobility management context. The MME (123) obtains the MR-UE-1 (101)'s context using the UE-1's ID (e.g. GUTI) provided in PDN Connection Release message (2011). The MME (123) uses the Local Identifier received in the PDN Connection Release (2011') to identify the CS related interfaces for UE-2 (102) after the pseudo-Detach.

In other words, the MME (123) would bind (or re-link) the Local Identifier and SGs interface (e.g. SGs identifier assigned for the UE-2) so that the MME can know, based on SGs interface through which an in-coming call to UE-2 is received, the Local Identifier of corresponding UE (UE-2), then the MME would initiate paging and MR/UE-1 can forward the paging to the corresponding UE-2 based on the Local Identifier provided from the MME as explaining later. The binding between SGs interface identifier (for the UE-2) and the UE-2's Local Identifier would be helpful when the MR/UE-1 also has CS capability because the MME wouldn't provide (include) UE-1's Local Identifier in the paging. By simply checking the presence of the Local Identifier, the MR/UE-1 can know whether the paging should be forwarded to the other UEs (of the Local Identifier) attached to the non-3GPP access or process for the UE-1 itself. From then on, the MME (123) makes use of the MR/UE-1 (101)'s (E)MM context to manage the UE-2 (102)'s mobility for the CS service preservation.

The MME (123) then initiates the removal of the network resources allocated for the 3GPP access of UE-2 (102). This is achieved with the signaling of PDN Connection Release Acknowledgement (2015) back towards the LIPA-GW (141) via the SGW (127), as in step 2015, and sending the PDN Connection Release towards the UE-2 (102) via the eNodeB (129), as in step 2017. The PDN Connection Release (2017) message will trigger the eNodeB (129) to release the related radio resources for the UE-2 as well.

In the PDN Connection Release message (2017) to the UE-2 (102), the MME (123) may also indicate to the UE-2 (102) (e.g. send the message including a flag with a meaning) that the CS service preservation is successful, and now the CS context of UE-2 (102) is bound to MR/UE-1 (101). Knowing this would allow the UE-2 (102) to safely turn off its 3GPP interface and starts to monitor CS related indication, e.g. paging, from the non-3GPP access from MR/UE-1 (101).

It is obvious to anyone skilled in the art that the above signaling messages shown in the figure are for illustration purpose. In the real implementation, these signaling may involve several rounds of message exchanges, and can be named differently. However, these variations do not affect the general principle of the present invention.

At certain time, the CS domain of the Operator's Core Network (120) may need to establish a connection to the UE-2 (102), e.g. an incoming CS call, or SMS, etc. In this case, the MSC/VLR (125) will send a CS Trigger (2019) to the MME (123) over the SGs interface. Since the SGs interface for UE-2 (102) is now bound to the MR/UE-1 (101)'s (E)MM context, the MME (123) would make use of MR/UE-1 (101)'s (E)MM connection to contact the UE-2 (102). As the SGs of the UE-2 (102) is indexed with the UE's Local Identifier (Local UE ID) received in step 2011', the MME (123) would also obtain the Local UE ID as well.

As shown in the figure, the MME (123) will tunnel the intended Paging message for the UE-2 (102) in a NAS message to the MR/UE-1 (101) (Tunneled Paging message (2021)). This message will be delivered directly to the MR/UE-1 (101) if it is in CONNECTED mode, and will trigger some paging for the MR/UE-1 (101) if it is in IDLE mode and be delivered once the MR/UE-1 (101) enters CONNECTED mode. The Tunneled Paging message 2021 is transferred via signaling plane between the MME (123) and the MR/UE-1 (101).

In this Tunneled Paging message (2021), the MME (123) includes the Local UE ID. When the MR/UE-1 (101) received the message, it would use the Local UE ID to map to the actual UE-2 (101)'s local non-3GPP connection, as in step 2023. The local non-3GPP connection may be a logical connection or link to the UE-2 (e.g. which can be identified by MAC address, IP address, SPI (Security Parameter Index) for the security connection such as using IPsec between MR/UE-1 and UE-2, some authentication ID, etc.) or physical connection or link to the UE-2 (e.g. which can be identified by dedicated channel identifier, etc.)

The Tunneled Paging message (2021) could be for example similar to that of the CS SERVICE NOTIFICATION message as defined in (NPL 6). However, in the invention, the NAS message is destined for MR/UE-1 (101), but the Paging Identity of the embedded CS SERVICE NOTIFICATION is that for the UE-2 (102). In case the Local UE ID is the same as the Paging Identity, e.g. S-TMSI or IMSI, there is no need for additional information added.

When received this Paging message via the Local Delivery (2023) on the local connection (e.g. WLAN, bluetooth, Zigbee, ethernet, USB, etc.) between MR/UE-1 and UE-2, the UE-2 (102) will check the Paging Identity and process it according to that specified in (NPL 6). For example, UE-2 (102) may turn on its 3GPP interface and respond with a Service Request or Extended Service Request towards the MME through the 3GPP access, i.e. through eNodeB (129), towards the MME (123), as in step 2025. In case of an incoming CS call, this would result in CSFB procedures being carried out as specified in (NPL 3), as indicated in step 2027. This way, the UE-2 (102) is able to obtain CS services, even though it does not have any 3GPP access connections established beforehand.

As the UE-2 (102) does not have any (E)MM/(E)SM context, the Extended Service Request (2025) from the UE-2 (102) would trigger the MME (123) to create some dummy context just to satisfy the procedure requirements of the CSFB operations as defined in (NPL 3). As the end result is just for the UE-2 (102) to connect to the CS Domain, these dummy contexts do not need any network side resources allocated. Therefore, the MME (123) can simply instruct the eNodeB to perform a RRC connection release with redirection with necessary information to redirect the UE-2 (102) to the CS domain, without setting up any EPS bearers in the PS domain. The MME (123) may also proactively prepare all these dummy or actual contexts when it sends the Tunneled Paging (2021) down towards the MR/UE-1 (101) or when the UE-2 has sent the service request signaling to the MME via non-3GPP connection (i.e. via MR/UE-1) if it's allowed to do so. Such that the UE-2 can start the call or service from CS domain immediately and handover time will be reduced, then user experience will be increased.

Alternatively, the MME (123) knowing that the UE-2 (102) has been pseudo-Detached, can reject the Extended Service Request with a specific cause code. This will cause to UE-2 (102) to re-select to the 2/3G access and continue with the CS only setup procedure. This way, the MME (123) does not need to perform any new procedures towards the eNodeB, and no additional function is needed on the 3GPP access network.

In case the UE-2 (102) really wants to transfer its RIPA and/or other existing connections back to via the 3GPP access, the Service Request or Extended Service Request (2025) can contain additional indication for the transfer request. In that case, the MME (123) would establish a default PDN connection with the LIPA-GW (141), and the UE-2 (102) can perform the PDN connection handover procedures defined in (NPL 2) afterwards to transfer the RIPA and/or other existing connections back to 3GPP Access. In other case, the connections via non-3GPP access may be released by the LIPA-GW or MR/UE-1 (for example, LIPA-GW or MR/UE-1 sends bearer release signaling to the UE-2 and/or operator's network entity), otherwise may be kept for PS services, e.g. for local network access, Internet access, etc.

When the UE-2 releases the PDN connections over non-3GPP access (i.e. via MR/UE-1), the UE-2 may be forced back to 3GPP access for the CS service which was preserved during the non-3GPP access. In detail, LIPA-GW receives PDN connection release request or bearer release request, the LIPA-GW indicates MME which has preservation context for the UE-2 (where the MME can keep information provided before on the handover processing from 3GPP to non-3GPP access for the UE-2) about UE's release of the connections via non-3GPP access, so that the MME initiates CSFB procedure (i.e. to send a paging to the UE-2) to transfer the attachment of the UE-2 to 3GPP access. After the initiation of paging to UE-2, same procedure will be performed as already explained. The MME may not initiate CSFB, instead just create CS bearer context for the UE-2 in order to page the UE-2 via 3GPP access. Such that the UE-2 can still keep the CS service even when it detaches from non-3GPP access and user benefit would be increased because the CS service is not released unintentionally. Otherwise or if the UE-2 shows its intention to release also CS service in the non-3GPP release procedure (e.g. by including indication or flag to indicate all the connection including the CS service are released), the LIPA-GW indicates the indication as well to the MME and the MME will release the resource on the SGs interface for the UE-2, such that unnecessary resources can be removed and system efficiency will be increased.

(Support of Other CS Services than Voice Call)

For certain CS based services, e.g. SMS, LCS, the MME may need to exchange multiple NAS messages with UE-2 (102), and does not need the UE-2 (102) to connect to the CS Domain. In such a case, the MME (123) can tunnel the message intent for the UE-2 (102) in the Downlink NAS Transport message towards the MR/UE-1 (101). In this case, the message sent to the UE-2 (102) via the Local Delivery is no longer a Paging message.

On the other direction, the UE-2 (102) may also use the local delivery method in non-3GPP access to send the response to the MR/UE-1 (101). Such messages will be send by the MR/UE-1 (101) using the Uplink NAS Transport back towards the MME (123).

In order for the MR/UE-1 (101) to differentiate if a message is intent for itself or UE-2 (102), additional indication in the Downlink NAS Transport or Uplink NAS Transport messages are necessary. The Indication could be the Local UE ID, or just a flag. The MR/UE-1 (101) may just broadcast the message internally via its non-3GPP access if it cannot uniquely identify the target. All the UEs connected through the non-3GPP access of MR/UE-1 (101) can receive the message and check if it is intended for itself.

The Local Delivery between the MR/UE-1 (101) and UE-2 (102) can be of many forms depending on the technology used. One possible method is IP based delivery to a predefined port. For example, the MR/UE-1 (101) serves as the mobile router, and therefore its address is known to the UE-2 (102). The UE-2 (102)'s address can be known by the MR/UE-1 (101) based on the mapping between Local UE ID and IP address. This is because at step 2005, the MR/UE-1 (101) can generate and store such mapping information.

Alternatively, they can directly use some non-3GPP access specific channels. For example if the non-3GPP access supports the IEEE802.21 mechanism, the local delivery can be implemented based on the Event Service or Information Serves, and if the non-3GPP access supports IEEE802.11u, the local delivery can be ANQP based message exchanges.

(u-Plane Based Paging for Pseudo-Detach)

With reference to FIG. 3, an alternative operation sequence of the present invention is shown. The operation is similar to that of the FIG. 2. Below, only the differences are highlighted.

As shown in the figure, the MR/UE-1 (101) has established a RIPA connection towards the LIPA Domain (140) via the Operator's Core Network (120), as indicated in step 3003. And this could be a result of an outbound handover of previously established LIPA connections.

Similar, UE-2 (102) also has a RIPA connection established, as in step 3003, and at step 3005, it starts to transfer its RIPA connections to the non-3GPP access provided by the MR/UE-1 (101). These operations are similar to that of step 2001, 2003, and 2005.

After the MR/UE-1 (101) received the Non-3GPP Handover Request (3005) and authorized the CS Service preservation, the MR/UE-1 (101) establishes a new EPS bearer towards the LIPA-GW (141), as indicated in step 3007. This is following the procedure as defined in (NPL 1), and using information provided by the UE-2 (102) through the Non-3GPP access Handover Request.

The MR/UE-1 (101) signals towards the LIPA-GW (141) with the Non-3G Hanover Signaling, as in step 3009. This is similar to that of step 2007 of FIG. 2. However, in this Non-3G Hanover Signaling message (3009), the MR/UE-1 (101) includes the GUTI of UE-1 (101) and the EPS Bearer ID (EBI) of the bearer established in step 3007.

With this information, the LIPA-GW (141) performs the handover, and binds the traffic for UE-2 (102) to the EPS bearer identified by the EBI for UE-1 (101). At the same time, the LIPA-GW (141) would bind the address of UE-2 (102) to the EBI of UE-1 (101).

Similar to step 2011 and 2011' of FIG. 2, the LIPA-GW (141) also issues some special PDN Connection Release message towards the MME (123) via SGW (127), as in step 3013 and 3013'. In this PDN Connection Release message (3013/3013'), the LIPA-GW (141) includes the GUTI of UE-1 (101) and the EBI it received in step 3009.

Once the MME (123) received the PDN Connection Release (3013/3013'), it starts the pseudo-Detach process, as indicated in 3015, similar to that of 2013 of FIG. 2. However, in this case, the MME (123) tries to bind the UE-2 (102)'s CS Domain interface, e.g. SGs, towards the UE-1 (101)'s (E)SM context for the EPS bearer identified by the EBI.

Therefore, when the CS Trigger (3021) arrives at the MME (123), the MME would obtain the (E)SM context based on the UE-1 (101)'s EBI. With such information, the MME issues a special Bearer Modification message, and embeds the CS related signaling message, e.g. a Paging message, to the LIPA-GW (141) via the SGW (127). One possible way to embed the CS signaling message is by placing them in a MME (123) generated PCO, such that it does not require SGW (127) changes. Otherwise, it can be embedded in the location information or CSG subscription information element, such that it can be guaranteed delivered to the LIPA-GW (141).

When the LIPA-GW (141) receives the special Bearer Modification message (3023), it can obtain the EBI from the message, and therefore is able to map to the IP address of the UE-2 (102), based on the information obtained in step 3009. Therefore, the LIPA-GW (141) would encapsulate the CS related signaling message, and send it directly via the user plane channel to the UE-2 (102), as in step 3025. For example, the UE-2 (102) and LIPA-GW (141) may have pre-agreed a special port number for this purpose, e.g. during the establishment process of the RIPA connections using PCO. In this case, the LIPA-GW (141) simply encapsulates the CS related signaling message towards that port of the UE-2 (102) IP address.

After receiving the CS related signaling message via the user plane, the UE-2 (102) performs the necessary procedures as defined in (NPL 6). For example, UE-2 (102) can send a Service Request/Extended Service Request (3027) towards the MME, which triggers the following CSFB procedures as in step 3029.

In case there needs to allow UE-2 (102) to respond back to MME (123) without turning on the 3GPP access, it can sends the message encapsulated in an IP packets destined to the LIPA-GW (141), which is its Home Agent or default gateway. The LIPA-GW (141) can also use the Modify Bearer procedure to relay the message to the MME (123).

In the above descriptions, it is using the PMIP as example protocols between MR/UE-1 (101) and LIPA-GW (141) for managing the mobility for UE-2 (102). However, this does not limit the invention to such protocols. In the real implementation, other mobility management protocols, e.g. GTP-C/U, can be used as well. This does not affect the general principle of the present invention.

(MME Initiated Pseudo-Detach for Low Priority Devices)

In the previous descriptions, the MME (123) performs the pseudo-Detach process, e.g. step 2013 or step 3015, based on the indication from LIPA-GW (141). However, in certain deployment, an MME may decide to move certain dual attached UE out of the 3GPP access to ease congestion, but continue to support the CS Domain services for these devices. In that case, based on the UE's information, e.g., subscription, MTC feature, or Lower priority indicator, the MME (123) can decide whether to perform a pseudo-Detach of the UE.

However, in order for this to work, the UE-2 (102) has to inform the MME (123) of the MR/UE-1 (101) information. This can be achieved by UE-2 (102) perform a TAU after it obtained non-3GPP connection through the MR/UE-1 (101). The TAU carries the information of the MR/UE-1 (101) obtained by UE-2 (102) through the establishment of the non-3GPP access connections.

Alternatively, UE-2 (102) can send a TAU via the non-3GPP access to the MR/UE-1 (101), and the MR/UE-1 (101) uses its own NAS connection to forward this towards the MME. For example, The MR/UE-1 (101) make use of the SRB2 that is dedicated for NAS transferring to forward the received TAU message from the UE-2 (102). This results in the eNodeB (129) forwarding the TAU message from UE-2 (102) using the S1-MME channel set up for the UE-1 (101). This result in the MME (123) binding the MR/UE-1 (101) to the UE-2 (102). And therefore, when the MME (123) decides to perform pseudo-Detach, it can obtain the MR/UE-1 (101) information.

(TAU Based Checking of Applicability and Token Generation)

In the previous description, certain access control should be imposed by the Operator's Core Network (120) system regarding the operation. Following are some options that allow the control to be carried out.

In a possible operation, the UE-2 (102) performs a TAU after discovering the MR/UE-1 (101) and before performing the handover towards the non-3GPP access (but decision of handover to the non-3GPP access is done), e.g. step 2005 or 3005. MME performs tracking area (i.e. location) update procedure to update UE-2's location accordingly, so that when the MME receives later a PDN connection release message from LIPA-GW (PGW), the MME can judge if the UE-1 and UE-2 are reasonably close (near) each other, and if the condition (proximity) is satisfied (i.e. they are reasonably close), the MME allows the CS preservation for the UE-2 to bind the SGs to UE-1's context as explained before. Basically, such judgment can be done based on subscription or operator's policy information. However, such information does not provide verification of their actual location.

For example, if the UE-1 and UE-2 are at different locations but the UE-1 may be able to send the binding request (i.e. handover signaling) if the UE-1 remembers some old request from the UE-2 in its memory, e.g. due to some buffering mechanism, and so on. This will clearly cause mis-alignment on the UE-2's location and then the packet to be sent to the UE-2 will be routed to the UE-1, and causes security problems. In order to avoid such situation, the location based judgment in the MME makes sense, and is helpful to ensure correct routing of packets for the UE-2, even when the UE-2 is in IDLE mode when the location in the MME may not be updated if the UE-2 is moving within the TA of the TAI list provided from MME. For further reliability, UE-1 may perform TAU as well when it processes handover signaling from the UE-2, such that the location information of the UE-1 and UE-2 are really updated and the MME can judge with the very latest information.

In the TAU which the UE-2 sends before actual handover to the non-3GPP access, the UE-2 (102) may indicate its intention of handover to non-3GPP access, the information about the MR/UE-1 (101), and the intention of preserving the CS services. After receiving the TAU, the MME (123) can perform the access control accordingly, for example, checking the location proximity of the UEs/devices, checking the subscription information and operator policies on whether it is allowed, checking the LIPA-GW is such aggregation is supported, etc. If such checks are successful, the MME (123) sends back a TAU response indicating the acceptance of such operation, and additional information to facility the operation, e.g. some Tokens.

UE-2 (102) can then continue with the operation, e.g. step 2005 or 3005, and making use of the Token.

This Token will include certain authorization information, e.g. digital signed certificates from MME, or cryptographic provable commands, that instructs the MR/UE-1 (101) to sends the GUTI in the Non-3GPP Handover Signaling, e.g. in step 2007 or 3009.

This Token is also forwarded in the handover signaling via non-3GPP access explained above, and would reach back to the MME (123) via LIPA-GW(PGW), e.g. in step 2011' or 3013'. Once the MME (123) receives the Token, it would also verify and compare with its stored information, and based on that to decide if the pseudo-Detach is allowed.

With these above operation, the Operator's Core Network is able to apply some control of the process, and security of the operation can be enhanced.

(Use of Other Identifiers than GUTI of UE)

In the above operation description, the MR/UE-1 (101)'s GUTI is included in the signaling in order for the MME to identify the context. However, in certain situations, this may not be always possible or allowed. In such a case, some other IDs, e.g. MSISDN, group ID, CSG ID, etc. can be used.

Alternatively, if the UE-2 (102) obtains a Token before the procedure, it may contain the necessary information to identify the UE-1 (101). For example, the MME may generate a temporary ID when the UE-2 (102) does the TAU, and include the temporary ID in the Token embedded in the TAU response.

(Using S2c DSMIP Protocol)

In certain deployment, the Mobile Router can only provide S2c interface as defined in (NPL 2). In that case, the signaling of the handover will be performed by the UE-2 (102) instead of Mobile Router (101), i.e. the signaling of step 2007 and 3009 are to be from UE-2 (102) directly.

In order to support such operation, the UE-2 (102) would need to know an identifier that can be used by the MME (123) to identify the MR/UE-1 (101). A few possible approaches can be used.

In case the Mobile Router/UE-1 (101) supports the solution, it may announce such an identifier to the UE-2 (102) via non-3GPP access specific methods when the UE-2 (102) obtains the connection with it. For example, it can either broadcast that in the Beacon message, or include that in the association message, or via the IP layer configuration messages, e.g. DHCP, Router Announcement, Router Advertisement, or via IEEE802.11u ANQP.

Alternatively, if the UE-2 (102) performs the TAU as described earlier before connecting and handover to the non-3GPP access offered by the MR/UE-1 (101), the UE-2 (102) can obtain such information from MME (123) in the TAU response.

Alternative, such information, e.g. group ID, can be manually configured on the UE-2 (102) by the user.

With such knowledge, the operation sequence introduced in FIGS. 2 and 3 can be applied with minor modifications. For example, the terminating point of the Non-3GPP Handover Signaling, e.g. 2007, 2009, or 3009, 3011, would be UE-2 (102) instead of MR/UE-1 (101). And, the protocol used would be the Dual Stack Mobile IP (DSMIP) as defined in (NPL 2) for the S2c interface.

The result of the operation sequence can be applied without essential modifications.

(Different MME)

In the above descriptions, it is assumed that the same MME (123) serves the UE-1 (101) and UE-2 (102). This may be applicable for most of the cases, as the two terminals are close by.

However, in certain special situations, they may be serviced by different MMEs, for example, due to the load balancing, use of different PLMN, or other reasons. In such a case, the presented operation would need some minor modifications.

When the MME (123) received the PDN Connection Release message (2011' or 3013'), it performs a pseudo-handover process, as if the UE-2 (102) needs to handover to the MME of UE-1 (101), following the procedure defined in (NPL 1). UE-2 (102)'s MME obtains the identity of UE-1 (101)'s MME by the GUTI information in the PDN Connection Release message (2011' or 3013').

As this is a special case of handover, there is only need to trigger the MSC/VLR (125) to update its association towards the new MME, and the new MME performs the context binding. The old MME will continue with the PDN connection release procedure, e.g. 2015, or 3017, and remove all the context of UE-2 (102) afterwards.

Therefore, when the CS Trigger (3021) comes, it will terminate at the UE-1 (101)'s MME, and therefore the procedure can continue.

In the operation sequence, the Mobile Router (101) would includes additional information in the Non-3G handover signaling for the UE-2 (102) towards the LIPA-GW (141). For example, it can include its own GUTI and the local ID for the UE-2 (102).

(Behavior of MR/UE-1)

With reference to FIG. 4, an example architecture of the MR/UE-1 (101) that supports the present invention is shown. As shown in the figure, the Mobile Router (400) includes four major function elements, namely, Non-3G Mobile Router Management (401), Local Paging Delivery (403), 3GPP Access Management (405), and Tunneled Paging Handling (407). It is obviously to anyone skilled in the art that there can be other function elements, e.g. those as specified in (NPL 1) and (NPL 2), not described for simplicity reasons. The inclusion of additional function elements does not affect the general principle of the present invention.

Among the function elements, the Non-3G MR Management (401) provides the function to control the non-3GPP access offered to other mobile terminals. For example, this includes managing the announcement of the availability of the service to the LIPA Domain (140) or other domains, the availability of preserving the CS Services (or namely CS paging proxy feature) for the mobile terminals, verification of the CS Service preservation request from the mobile terminal connected via the non-3GPP access, signaling of the handover for the mobile terminals with indication of CS Service preservation related information, and access control and bearer management functions as defined for trusted or untrusted non-3GPP access functions, e.g. MAG, PDG or ePDG in (NPL 2).

For example, if the non-3GPP access used in the MR (400) is WLAN, the Non-3G MR Management (401) function could be the SME of the WLAN AP with the router and MAG function in (NPL 5). It may also include the ePDG function as defined in (NPL 2), which includes the access control functions, and includes the protocol stacks for the interactions with the AAA Proxy or Server in the Operator's Core Network (120).

Also, Authentication or authorization process of UE-2 (102) may happen. In order to achieve this, the non-3GPP MR Management (401) would need to have access to the AAA Server or AAA Proxy in the Operator's Core Network (120). This can be easily achieved by allocating some special AAA Proxy to the MR/UE-1 (101) when it connected to the Operator's Core Network (120) based on its subscription information. This access may be done through 3GPP Access Management (405). For example, non-3GPP MR Management (401) may request such a connection in the PCO element of the PDN Connectivity Request. The P-GW (LIPA-GW 141) of MR/UE-1 (101) may setup special connections towards an AAA Proxy based on the PCO information and system authorization.

After received the Non-3G Handover Request from UE-2 (102), the Non-3GPP Access MR Management (401) would send the Non-3G Handover Signaling towards the LIPA-GW (141) to switch UE-2 (102)'s connection(s) to non-3GPP access. In case Proxy MIP (PMIP) is used in the system for managing the mobility for UE-2 (102), the Non-3G Handover Signaling could be the Proxy Binding Update message.

When the Non-3GPP MR Management (401) decides that the UE-2 (102) wants or is required to preserve its CS services, the Non-3GPP MR Management (401) would include additional information in the Non-3G Handover Signaling messages. For example, it would include its identifier in the 3GPP network such as a temporary ID like GUTI, TMSI, etc. or a permanent ID like IMSI, MSISDN, etc. and a Local UE Identification to identify the UE-2 in the WLAN access (non-3GPP access), and/or the Token in the message to the LIPA-GW (141).

It should be noted, that the Non-3G MR Management (401) function would make use of the connections provided by 3GPP Access Management (405) to deliver the related signaling or data messages.

The 3GPP Access Management (405) generally follows the functions defined for a UE in (NPL 1), with additional functions to assist the MR (400)'s operation. For example, the 3GPP Access Management (405) may be triggered by the Non-3G MR Management (401) to establish a connection to the LIPA Domain (140) or any other domain required.

The 3GPP Access Management (405) can also be triggered to include additional information in the connection management signaling, e.g. using the PCO, to indicate the support of present invention, such that additional processing at the network side can be carried out.

The 3GPP Access Management (405) is also capable of receiving tunneled paging messages from the operator's core network. For example, the MME (123) could signal to the MR/UE-1 (101) over NAS signaling channel, with a paging message embedded. The paging message may not be intended for the MR/UE-1 (101), e.g. it includes a Local UE ID that points to UE-1 (102). Once the 3GPP Access Management (405) receives such a tunneled paging message, it would pass it to the Tunneled Paging Handling (407) for further processing.

The Tunneled Paging Handling (407) will process the embedded the message and to decide on the actual destination of the paging. For example, if there is a Local UE ID included, it would be translated to the actual mobile terminal's identity, e.g. UE-2 (102), with the help of the information from Non-3G MR Management (401) function. If there is no Local UE ID present, the Tunneled Paging Handling (407) would check whether the message is intended for the MR/UE-1 (101) itself.

If the embedded paging or NAS message is verified for a locally attached mobile terminal (to the MR (400)), the message will be forwarded to the Local Paging Delivery (403) function via the Non-3G MR Management (401). It is obvious to anyone skilled in the art that the message can also be delivered by the Tunneled Paging Handling (407) directly to the Local Paging Delivery (403) with the help of needed information obtained from Non-3G MR Management (401). This does not affect the general principle of the present invention.

The Local Paging Delivery (403) makes use of the Local UE ID to locate the target mobile terminal attached to the MR (400), and identity the proper delivery mechanism of the message. For example, The Local Paging Delivery (403) may embedded the message in an IP packet and sent to the UE-2 (102) via a predefined port, or encapsulate the message in a layer 2 packet to a predefined MAC address, or send it using multicast mechanism, or deliver it using IEEE802.21 ES/IS/CS mechanisms, etc. The choice of the mechanism to deliver the message depends on the non-3GPP access technology in use, and the capability of the MR (400) and the mobile terminal attached.

It is obvious to anyone skilled in the art that in case the MR (101) is enhanced to allow bi-direction delivery of the NAS message between UE-2 (102) and MME (123), e.g. to support the SMS or LCS service, the function of Local Paging Delivery (403) would be enhanced to receive a NAS message from the UE-2 (102) over the Non-3GPP access locally as well. This can be achievable similar to the above describe paging message delivery, with the destination reverted. In such case, the Tunneled Paging Handling (407) would also be enhanced to generate compliant NAS message to be delivered over 3GPP Access Management (405) based on the message received from UE-2 (102) via Local Paging Delivery (403) function.

When the Tunneled Paging Handling (407) receives a tunneled paging message from MME or after processed the tunneled paging message, the Tunneled Paging Handling (407) may perform Bearer Resource Modification procedure to reduce resources (e.g. QoS resources such as bit rate (MBR, GBR, AMBR, etc.), priority (ARP, etc.), ensured BER, ensured latency) of the PDN connection or PDP context (in some case, these are called simply as bearer or data bearer between the MR/UE-1 and the LIPA-GW (PGW)) accommodating traffic flow of the UE-2 (102), because the tunneled paging message would move the UE-2 (102) from the non-3GPP access network provided by the MR (101) to 3GPP access network to receive the CS service (to terminate in-coming call) so that the resources allocated for the UE-2's traffic can be reduced for system efficiency. The Tunneled Paging Handling (407) may delete/terminate the connection for UE-2 traffic when receiving or after processed the tunneled paging message (or further after performed tunneled paging process, i.e. after forwarded service request message from UE-2).

(Behavior of UE-2)

With reference to FIG. 5, an example architecture of the UE-2 (102) is presented. As shown in the figure, the UE (500) includes four major function elements, namely, the 3GPP Access Management (501), the Non-3G Access Management (503), Mobility Management (505), and the Local Paging Receiving (507). It is obviously to anyone skilled in the art that there can be other function elements, e.g. those as specified in (NPL 1) and (NPL 2), not described for simplicity reasons. The inclusion of additional function elements does not affect the general principle of the present invention.

The 3GPP Access Management (501) implements the general functions as defined for the UE in (NPL 1) and (NPL 6). It also include a few additional functions for supporting the present invention, e.g. the capability to process the locally received paging message from the Non-3GPP access and respond accordingly. It may also respond with a NAS message and pass to the Local Paging Receiving (507) function as a response, if the bi-direction NAS signaling over Non-3GPP access is utilized to support certain CS Services, e.g. SMS or LCS, etc, over Non-3GPP access.

Additionally, the 3GPP Access Management (501) may also be triggered by the Mobility Management (505), when a special Non-3GPP access, e.g. an access point, with CS paging proxy capability (which is described in this embodiment) is detected, to perform TAU before the handover of certain connections to the Non-3GPP access. It's possible for the 3GPP Access Management (501) to detect the target Non-3GPP access is capable of the invention when detecting whole or parts of access identifier (e.g. SSID) or some other explicit indication (e.g. in a beacon signal) provided from the access network (i.e. access point), or access point's MAC address is same as a pre-determined or pre-configured value. Thus, the UE (500) can identify that it is moving and connecting to a special MR/UE-1 (101) which has capability of CS paging proxy described in the embodiment. The TAU could be enhanced for the network, e.g. MME (123), to deliver certain information for the CS Service Preservation, e.g. the Token.

When the UE (500) detects a SSID of target Non-3GPP access network, the UE (500) may ask, e.g. to send the TAU or other message (such as Access Network Discovery Selection Function (ANDSF) request) containing the SSID and/or a flag to ask, if the target Non-3GPP access has capability of the special function, i.e. CS paging proxy function, such that the UE (500) doesn't have to keep database of the capability and can reduce memory consumption and follow updated information.

The Non-3G Access Management (503) allows the UE (500) to connect to the MR/UE-1 (101) according to the procedure defined in (NPL 2). In order to support the present invention, the Non-3G Access Management (503) also can provide additional indication in the signal for the request of CS Service Preservation with related information, e.g. the Token.

The Non-3GPP Access Management (503) is also capable of allowing the UE (500) to receive 3GPP Paging or NAS messages via the Non-3GPP access, and pass that to the Local Paging Receiving (507) for further process.

The Non-3GPP Access Management (503) would also provide additional information to the Mobility Management (505) for the UE (500) to decide if and how a handover should be processed. For example, if may indicate whether the CS Service Preservation could be offered on the Non-3GPP Access. This would allow the Mobility Management (505) to decide if the connections should be handovered to the Non-3GPP access, and if the 3GPP interface should be totally shut down.

The Local Paging Receiving (507) would present itself as if it is the lower layer of the 3GPP Access, such that the 3GPP Access Management (501) could be made transparent to the present invention operation when possible. In such cases, the Local Paging Receiving (507) function can repackage the paging message received over the Non-3GPP access, and present it to the 3GPP Access Management (501) as if it is received directly from the 3GPP access. This can keep the changes to the current UE's implementation minimum.

Alternatively, the Local Paging Receiving (507) can be also arranged to receive the NAS message from the 3GPP Access Management (501), and repackage it to be delivered over the Non-3GPP access, in case the bi-direction NAS communication between UE-2 (102) and MME (123) is to be supported over Non-3GPP access.

(Behavior of MME)

With reference to FIG. 6, and example architecture of MME (123) is presented. As shown in the figure, the MME (600) includes four major function elements, namely, the 3GPP PS Service Management (601), the CS Service Management (603), the Pseudo-Detach Management (605), and the Tunneled Paging Handling (607). It is obviously to anyone skilled in the art that there can be other function elements, e.g. those as specified in (NPL 1) and (NPL 3), not described for simplicity reasons. The inclusion of additional function elements does not affect the general principle of the present invention.

3GPP PS Service Management (601) is generally as specified in (NPL 1). However, when the MME (123) receives the CS Service Preservation indication in the PDN Connection Release (2011' or 3013'), it would trigger the Pseudo-Detach Management (605) function. In this function, the UE-2 (102)'s CS Service interfaces, e.g. the 613 from CS Service Management (603), would be (re-) linked to the MR/UE-1 (101)'s context, obtained using the information from the PDN Connection Release (2011' or 3013'). The Pseudo-Detach Management (605) also keeps track of the Local UE ID, for the further mapping of the CS trigger messages.

For example, the Pseudo-Detach obtains the MR/UE-1 (101)'s context using the GUTI provided, and links the UE-2 (102)'s SGs to it. So, when the CS Service Management (603) function receives a CS trigger targeting UE-2 (102), the Pseudo-Detach Management (605) would translate that to the UE-1 (101)'s identity and thus allow the 3GPP PS Service Management (601) to identify the UE-1 (101)'s context. In case that UE-1 (101)'s identity is to be updated, e.g. GUTI reallocation, the 3GPP PS Service Management (601) would update the Pseudo-Detach Management (605) accordingly, such that the Pseudo-Detach Management (605) can always have the most updated identifier for the UE-1 (101).

Pseudo-Detach Management (605) may perform authorization for the CS service preservation of the UE-2 (102) on the UE-1 (101), and also check if the nodes (UE-1 and UE-2) are reasonably close each other using location information as described above.

Upon detection of the CS Trigger and obtaining the identifier for the UE-1 (101), the Pseudo-Detach Management (605) passes the information to the 3GPP PS Service Management (601) together with the Local UE ID for the UE-2 (102). In a certain variation, the Pseudo-Detach Management (605) can also store the last used identifier of the UE-2 (102), and pass it together, such that the 3GPP PS Service Management (601) can form a paging message accordingly.

As the 3GPP PS Service Management (601) detected the information about the Local UE ID for the UE-2 (102), it would know that the CS Trigger is meant for a UE attached to UE-1 (101), and therefore should be delivered using a tunneled paging method. The 3GPP PS Service Management (601) would then pass the context information about the UE-1 (101) together with the received information to the Tunneled Paging Handling (607). In the Tunneled Paging Handling (607) function, the 3GPP Paging message for UE-2 (102) will be assembled using the information passed from Pseudo-Detach Management (605) and the 3GPP PS Service Management (601). For example, the Paging message will be containing the CN domain of CS, and the paged device identifier should be using UE-2 (102). At the same time, the Paging message will be encapsulated into a NAS message that is destined to the UE-1 (101) based on the context passed from the 3GPP PS Service Management (601). This NAS message will then be delivered to the UE-1 (101) using the existing NAS context for UE-1 (101). In case UE-1 (101) is in IDLE mode, it would be first paged and brought to CONNECT mode, before the NAS message with the tunneled Paging for UE-2 (102) be delivered.

At the same time, the Tunneled Paging Handling (607) would also prepare the necessary context information for handling the Service Request or Extended Service Request to be received from UE-2 (102). For example, the Tunneled Paging Handling (607) can form a dummy context, and upon receiving the Service Request or Extended Service Request from UE-2 (102), it would trigger a handover to CS domain without PS Handover. Or, the Tunneled Paging Handling (607) would mark the context in a way that the Service Request or Extended Service Request from UE-2 (102) would be rejected with a proper cause code that would result in the UE-2 (102) autonomously reselect to CS domain and proceed with the CS connection.

The Tunneled Paging Handling (607) may construct the tunneled paging message with the paging message for UE-2 (102) and Bearer Resource Modification for the MR/UE-1 (101), e.g. where the Bearer Resource Modification message would contain the paging message, so that the MR/UE-1 will reduce resources (e.g. QoS resources such as bit rate (MBR, GBR, AMBR, etc.), priority (ARP, etc.), ensured BER, ensured latency) on the PDN connection or PDP context accommodating traffic flow of the UE-2 (102), because the tunneled paging message would cause the UE-2 (102) to move out from the MR (101) to 3GPP access network to terminate the CS service. Tunneled Paging Handling (607) may delete/terminate the connection for UE-2 traffic when receiving or after processed the service request from UE-2.

With the above formation, the impact to the existing implementation of the MME could be minimized, e.g. major functions in the CS Service Management and 3GPP PS Service Management could be kept almost intact. The main enhancement could be organized into the Pseudo-Detach Management and the Tunneled Paging Handling. It is obviously to anyone skilled in the art that there can be other function elements, e.g. those as specified in (NPL 1) and (NPL 2), not described for simplicity reasons. The inclusion of additional function elements does not affect the general principle of the present invention.

(Behavior of LIPA-GW(PGW))

With the reference to FIG. 7, an example architecture for the L-GW or P-GW (LIPA-GW (141)) of the present invention is presented. As shown in the figure, the L-GW/P-GW (703) includes three major function elements, namely, Bearer Management (701), the Mobility Management (703).

The Bearer Management (701) is capable processing the normal bearer management and signaling of the S5 interface as defined in (NPL 1) and (NPL 2). In additional, it is capable of receiving the additional information in the signaling for the indication of the CS Preservation request, as in Non-3G HO Signaling (2009 or 3011). When the Bearer Management (701) sees such indication, it passes the message for processing to CS Preservation Assistance (705).

In another aspect, when the UE-1 (101) connects and establishes the connection, it may indicate in a PCO that it is going to be a Mobile Router and providing the CS Preservation Service. In that case, the Bearer Management (701) would inform the CS Preservation Assistance (705) as well. The CS Preservation Assistance (705) would then help to establish the necessary connections, e.g. towards the AAA Proxy or AAA Server, for the UE-1 (101).

When the UE-2 (102) needs to perform the handover towards the Non-3GPP access, the CS Preservation Assistance (705) would provide the necessary information to the Mobility Management (703). This will result in the L-GW/P-GW (700) to initiate the bearer tear down in the 3GPP access side with additional information embedded, e.g. the UE-1 (101)'s GUTI, Local UE ID for UE-2 (102), EBI, etc., as in 2011 or 3013.

In case the U-plane based CS Service Preservation mechanism, as in FIG. 3, is used, the CS Preservation Assistance (705) would also create and maintain a mapping of the EPS Bearer signaling and the u-plane bearers, such that when the L-GW/P-GW (700) received the bearer management signaling (e.g. 3023), it would covert that according and send via the u-plane bearer to the UE-1 (101) with the Local UE ID or EBI that can help the UE-1 (101) to map it to UE-2 (102) address.

Embodiment 2

With reference to FIG. 8, an alternative architecture that supports the present invention is presented. This architecture is largely similar to that shown in FIG. 1. Therefore, in the following only the differences are highlighted.

As shown in the figure, the main difference comparing to the architecture in FIG. 1 is that the PGW (801) is located in the Operator's Core Network (120). This PGW (801) provides UE-1 (101) and UE-2 (102) services to the PDN Service domain (820). This could be for example, the IMS Service domain, the SIPTO service domain, the Local Breakout service domain, the Corporate Network service domain, or campus network service domain.

The PGW (801) may be selected by the operator's core network (120) to be close to the 3GPP access's point of attachment to satisfy the requirement, e.g. for SIPTO, for local breakout, etc. It could be also be selected to be at another location, e.g. for IMS service, etc. However, for UE-1 (101) and UE-2 (102), when the same APN or service is requested, the same PGW (801) would be selected by the network, e.g. because they are in the same cell requesting for the SIPTO service, or they are requesting for the same IMS service, etc. Therefore, the essential assumption is similar to that of the architecture as shown in FIG. 1.

It is obvious that the operation sequence and functions as described in Embodiment 1 also applies to the architecture in FIG. 8, with the PGW (801) performing the function of the LIPA-GW (141) as in FIG. 2 and FIG. 3, and implements the function elements as in FIG. 7.

Embodiment 3

With reference to FIG. 9 and FIG. 10, an alternative architecture that supports the present invention is presented. These architectures are largely similar to that shown in FIG. 1 and FIG. 8 respectively. Therefore, in the following only the differences are highlighted.

As shown in the figure, the main difference comparing to the architectures in FIG. 1 and FIG. 8 is that a fixed or portable Router/UE-1 (1101) is located instead of Mobile Router/UE-1 (101). The Router/UE-1 (1101) has 3GPP and Wireless LAN interfaces but is unlikely to move for a certain time period or forever. This is because of easy establishment where the location of establishment is not restricted by termination point of broadband line (e.g. FTTH, ADSL, etc.) since it uses 3GPP wireless access. An example scenario would be that a user of UE-2 (102) visits some restaurant where wireless access service is provided using the Router/UE-1 (1101) and the UE-2 (102) connects to LIPA Domain (140) (i.e. LIPA-GW (141)) in user's residential/enterprise premise or PDN services (i.e. PGW (801)) via the Router/UE-1 (1101). Another example scenario would be that a user of UE-2 (102) connects to PDN services (i.e. PGW (801)) via the Router/UE-1 (1101) in user's residential premise or enterprise premise. In those scenarios, the user would like to access through non-3GPP connection because of some additional local services, but in case where in-coming call for the user comes to MME (123) via MSC (125), it should be paged to move to 3GPP access network so that the UE-2 (102) can get the in-coming CS services.

It is obvious that the operation sequence and functions as described in Embodiment 1 also applies to the architectures in FIG. 9 and FIG. 10, with the Router/UE-1 (1101) performing the function of the Mobile Router/UE-1 (101) as in FIG. 1 and FIG. 8, and implements the function elements as in FIG. 4.

Embodiment 4: UE-1 Provides Trusted WLAN that May Support GTP S2a

In case the operator's core network supports the trusted WLAN access based on GTP, the Mobile Router/UE-1 (101) can perform the function of a GTP peer and the corresponding AAA peer in a trusted WLAN. In this setting, the Mobile Router/UE-1 (101) needs to establish a AAA connection with a AAA Server in the operator's core network, and GTP tunnel with the LIPA-GW (141)/PGW (801) selected for the UE-2 (102).

In this case, the Mobile Router/UE-1 (101) may support the use of GTP based protocol for the connection towards the LIPA-GW (141)/PGW (801). In this case, the signaling message with the LIPA-GW (141)/PGW (801), e.g. at step 2007, 2009 can be the GTP-C based messages like Create Session Request and Create Session Response as in (NPL 1).

In the above described case, the Mobile Router/UE-1 (101) essentially provides the whole trusted WLAN access network functions, e.g. the AAA peer, GTP peer functions, etc. When the UE-2 (102) obtains the access to the Mobile Router/UE-1 (101), corresponding AAA Server in the operator's core network will provide the UE-1 (101)'s profile to the Mobile Router/UE-1 (101), such that the GTP based connection to the LIPA-GW (141)/PGW (801) would be established correctly. The functions of the trusted WLAN access network function is as defined in (NPL 7)

When the Mobile Router/UE-1 (101) implements the trusted WLAN access network function, the procedure step for the non-3G Handover Request and Acknowledgement, e.g. in step 2005 and 2010, 3005 and 3011', may be layer 2 triggers like the EAP messages.

Embodiment 5: M2M Device Trigger

In the above descriptions, the UE-2 (102) is expected to receive CS services, and thus requires the pseudo-context to be managed by the network. In another use case, the UE-2 (102) may be a machine type communication device. In this sense, the services expected by the UE-2 (102) may be specific to machine type communication, e.g. SMS, Device Trigger, etc. Therefore, the triggers or messages the MME (123) received may no longer come from the MSC/VLR. Instead, they can be sent by the SMS-SC or a MTC Server, or MTC interworking function. Those messages can be delivered in the CS domain, and thus the previous described operations apply. In an alternative architecture, those messages could be also delivered over the PS domain over the control plane, e.g. within the NAS messages. In this case, the MME does not page the UE-2 (102), but rather sends the messages UE-1 (101)'s NAS. Upon receiving the Device Trigger message, the UE-2 (102) may choose to establish a connection via 3GPP access or the non-3GPP access via UE-1 (101) depends on its local policy and operator configurations.

Embodiment 6: AAA Server Performs MME Function

In the previous descriptions, the Mobile Router/UE-1 (101) is connected to the Operator's Core Network (120) via the 3GPP access, and therefore, the MME (123) is in charge of handling the inventions. In another alternative operation, the Mobile Router/UE-1 (101) may be connected to the Operator's Core Network (120) via other means, e.g. the non-3GPP access, or via Broadband Forum Access network and a security gateway. In this case, the Mobile Router/UE-1 (101) may itself be controlled by an AAA Server in the Operator's Core Network (120) instead of the MME (123).

In this case, the previous described operation needs some modifications. As the AAA Server is replacing the MME (123) to handle the connection for both Mobile Router/UE-1 (101) and UE-2 (102), the interface towards the CS domain or other message source (e.g. SMS-SC, MTC Server, MTC Interworking function) can be also transferred to the AAA Server. Therefore, when the UE-2 (102) handovers its connections to the non-3GPP access via UE-1 (101), the MME (123) should transfer the established SGs interface or other interfaces (e.g. with MTC Server or SMS-SC) to the AAA Server as part of the pseudo-Detach process. This can be achieved by the MME (123) obtaining the AAA Server information from the HSS, and sending a trigger with the relevant information to the AAA Server, which re-establishes the interfaces towards MSC/VLR, MTC Server, etc. Alternatively, the UE-2 (102) may inform the AAA Server regarding the MME when it obtains the non-3GPP access connections, e.g. in the Authenticating/Authorization process. The AAA Server would then inform MME for the transfer of the SGs interfaces. Alternatively, the MME keeps those interfaces, but would forward the messages to the AAA Server.

When the AAA Server receives the message over the transferred interfaces, e.g. an SMS over SGs, or a CSFB trigger over the SGs, it would trigger a Server initiated AAA signaling towards the UE-2 (102), e.g. the EAP re-authentication request, etc. And in the due process, the AAA Server would inform the message to the UE-2 (102) which would act up it accordingly.

Embodiment 7: Mobile Relay with Non-3G Access

In case the Mobile Router/UE-1 (101) implements the Relay function over interface 113 and the eNodeB (129) implements the Donor eNodeB function as defined in [NPL 8], the present invention can operate in an alternative mode. As shown in FIG. 11, the UE-2 (102) will use the non-3GPP access, e.g. WLAN access, to connect to the Mobile Relay/UE-1 (1201), which in turn uses the 3GPP access, e.g. LTE access, to connect to the Donor eNodeB (1209) to the Operator's Core Network (120). The UE-2 (102) implements the non-AP STA functions and the UE-1 (101) implements the AP STA function as defined in IEEE802.11u [NPL 9]. Furthermore, the Mobile Relay/UE-1 (1201) can implement the necessary functions that is defined for the Hotspot2.0.

When The UE-2 (102) decides to connect to the Mobile Relay/UE-1 (1201) based on discovery information and some local or operator policies, e.g. as that defined in the Hotspot2.0 sequences, the UE-2 (102) can still reuse the 3GPP NAS procedures for the connection establishments. For example, instead of using normal WLAN authentication procedure based on EAP, the Mobile Router/UE-1 (1201) may broadcast its capability of supporting 3GPP based AKA procedures via the ANQP features of the IEEE802.11u. In this case, the UE-2 (102) will use the ANQP messages to encapsulate its 3GPP NAS messages towards the Mobile Relay/UE-1 (1201). In turn, the Mobile Relay/UE-1 (1201) will forward this NAS messages to the MME (123) as if it's a base station (eNodeB), similar to that of the Relay function defined in [NPL 8].

In essence, the Mobile Router/UE-1 (1201) and UE-2 (102) can emulate the 3GPP access over the non-3G access on interface 1211, with the ANQP function of the IEEE802.11u substituting the control plane, e.g. the SRBs, and the normal WLAN data frame exchanges emulating the user plane. This also allows the UE-1 (1201) and UE-2 (102) to emulate the dedicate bearers by using the QoS Action frames, e.g. ADDTS, DELTS, etc.

When the MME (123) receives such signaling, it would take that the UE-2 (102) has moved to a cell under the Mobile Relay (1201), and does not recognize it is using non-3GPP access. Therefore, normal mobility procedures as defined in SAE 3GPP access will be carried out, e.g. handover the PDN connections to the PGW (801) for UE-2 (102) to the Donor eNodeB (1209) or the Mobile Relay/UE-1 (1201) as if they are the new Serving Gateway. In this case, full services for the UE-2 (102) could be provided to the UE-2 (102) via Mobile Relay/UE-1 (101), as if the UE-2 (102) is still connected through 3GPP access.

In an alternative operation, the Mobile Relay/UE-1 (1201) may still follow the non-3GPP procedure for the authentication of the UE-2 (102) before allow it connected. In such cases, the Mobile Relay/UE-1 (1201) will connect to an AAA Server in the Operator's Core Network (120), not shown in the figure, and process it according to the non-3GPP access procedures, e.g. EAP based AAA. However, in the process, the Mobile Relay/UE-1 (1201) can indicate to the AAA Server that this is just for the pure access control, and therefore, the AAA Server does not need to perform other procedures, e.g. talk to the PGW or the PCC framework, etc. After the UE-2 (102) is connected, 3GPP based NAS signaling can be used to obtain the proper context setup on Mobile Router/UE-1 (1201) as described in previous operations. This way, there will be added security for the Mobile Router/UE-1 (1201). And, as this is only for the initial connection setup, the extra signaling does not add much burden for the system. The UE-2 (102) and the Mobile Relay/UE-1 (1201) may save some security context about this connection, such that next time they do not need to go through the non-3GPP authentication procedure again. This can further reduce the extra signaling.

Regarding the decision for UE-2 to switch its connection between 3G cellular and non-3G (WLAN) accesses even via same UE-1, it may be based on UE-2's detection that current traffic needs to be routed via non-3G access (or via 3G access) due to some operator policy (e.g. ISMP (Inter-system mobility policy) or ISRP (Inter-system routing policy)) or UE-2's condition/preference (e.g. according to remaining battery level, bandwidth required from application), otherwise UE-1's or operator network's decision to initiate SIPTO (Selective IP Traffic Offloading) to non-3G access (or release the SIPTO from non-3GPP to 3G accesses) for the UE-2's traffic.

Embodiment 8: UE-2 is a Roamer

In the operations of the above embodiments, the UE-2 (102) may be a roaming user, i.e. it comes from a different operator's network than that of the MME (123). In this case, the MME (123) knows it from the UE-2 (102)'s context, and would set a special flag in the context binding process, e.g. step 2013, or 3015. Therefore, when the MME (123) performs the tunneled paging, e.g. in step 2021, or 3025, such indication would be included. When UE-2 (102)'s receives such paging with the special flag, it knows that it should connect back to its home network as the service pending can only be supported from there. This is especially useful when MME (123) knows the nature of the services and can decide that the current network does not support it, e.g. VoLTE, emergency, service user, etc. This can greatly save the time and energy for the UE-2 (102) to avoid additional domain selection when powering on the 3G interface.

It is obvious to anyone skilled in the art that the MME (123) may also indicate such information during the UE-2 (102)'s service request procedures.

Embodiment 9: PLMN Basis Decision (MR Providing its Operator Info for UE's Decision)

As described in the above operation, the Mobile Router/ UE-1 (101) may announce additional information for the UE-2 (102) to decide on the connection establishment. For example, if the Mobile Router/UE-1 (101) supports IEEE802.11u or Hotspot2.0, it may indicate the PLMN or ePLMN it is current currently using over the interface 113. By checking this, the UE-2 (102) can decide whether the UE-1 (101) is connected to the same operator network or not, e.g. based on the PLMN ID or the ePLMN IDs. Depends on the applications running and/or operator policies, the UE-2 (102) can make more intelligent decisions to avoid any possible service interruptions, e.g. to initiate attachment or handover procedure to the UE-1 when UE-1's PLMN is of some operator as UE-2's or just the PLMNs are same.

(UE Providing its Operator Info for MR's Decision)

Also, the UE-2 (102) may indicate additional information to the Mobile Router/UE-1 (101) for it to decide if to initiate the binding/pseudo-detach process for the UE-2 (102). For example, the UE-2 (102) may indicate its currently connected (or registered) operator on its 3GPP interface when establishing the WLAN connection with Mobile Router/ UE-1 (101), e.g. indicating the PLMN ID or the equivalent PLMN IDs using IEEE802.11u mechanism, or via extensions to the IP layer DHCP/RS messages. This way, the Mobile Router/UE-1 (101) can decide if the UE-2 (102) is served by the same operator's network and whether resources optimization could be achieved by performing the aggregation. The Mobile Router/UE-1 (101) may not perform an aggregation if it decides that optimization could not be achieved based on the UE-2 (102) provided information and the operator's policy, e.g. when they are connected/ registered to different operators.

(MME's Decision Based on Registered PLMNs)

Also in the previous operation, the MME (123) may decide whether to perform binding (pseudo-Detach) for the context of UE-2 (102) to UE-1 (101), based on the subscription information, the context status of both UEs, roaming agreement, etc. For example, MME (123) can check whether UE-1 (101) and UE-2 (102) are connected to the same PLMN (or ePLMN) based on their context, and would reject the binding if they are not the same because it may leads to network resources wastage. Or, the MME (123) may check if the roaming agreement allows all the current services of UE-2 (102) can be supported over UE-1 (101)'s link, if any one of them is roaming. If there are services that cannot be supported over UE-1 (101)'s link, or there are services leads to network resources wasted, the MME (123) may reject the binding. Also, the MME (123) may check the HSS of both UE-1 (101) and UE-2 (102), as there may be special settings regarding the binding in the subscription profiles. And, if there are explicit or inexplicit prohibitions of such binding, the MME (123) would not perform the binding.

(Benefit from the PLMN Basis Decision)

With the above described additional checking and authorization of the binding operation, the network and operator can guarantee that the network resources can be always optimized after the binding operation/aggregation. Also, it can help to avoid any potential service interruptions to the user due to inappropriate binding/aggregation.

Some additional or alternative decision to above description, by UE-1, UE-2 or MME, based on the registered PLMNs of UE-1, UE-2 may be the target APNs of UE-1 and UE-2. Because there would be limitation according to operator's policy or roaming agreement between operators, some combination of APNs (i.e. networks (PDNs) for specific services) may not be allowed, thus context aggregation/ binding (pseudo-Detach) wouldn't be possible/allowed when UE-1 and UE-2 are being under different operators. For example, it may be possible to aggregate Internet traffic (i.e. the UE-1 and UE-2 have connection specified with APNs for internet access) even they are connecting different operators, while it may not be allowed some operator specific services such as SMS (Short Message Service), IMS (IP Multimedia Service), etc (i.e. the UE-1 and UE-2 have connection specified with APNs for operator specific services). It may be simply rejected the aggregation if the CS services is completely its operator specific.

Embodiment 10: Another Roaming Case of UE-2

In some other scenario than the previous embodiments where a user, who owns both the Mobile Router/UE-1 (101) and the UE-2 (102), goes for a trip to some foreign country, it may be beneficial to aggregate the connections of UE-1 and UE-2 from user perspective. Because the user actually made a subscription of the Mobile Router/UE-1, e.g. with 7 days limitation for free internet access, at the airport, the Mobile Router/UE-1 would have cellular connection to its HPLMN during the trip, while the user's mobile phone (UE-2) will be a roamer to the cellular network. In such a case, the user would like the UE-2 more to connect via the Mobile Router/UE-1 due to his/her payment reduction, and rather the user may want the UE-2 to keep disconnecting from the cellular network unless any cellular specific service, which is allowed only via cellular connection, is required. If the UE-2 keeps the cellular connection, some of application may send packets via the cellular connection even during its WiFi connection via Mobile Router/UE-1 is available. Basically it's not possible for the user to control communication path of all the application in the UE-2, such that the communication of the application via cellular connection would not preferable to the user in such a roaming case.

In order to improve user experience for the above case, Mobile Router/UE-1, UE-2 or MME may have decision to perform binding (pseudo-Detach) for the context of UE-2 to Mobile Router/UE-1 when the Mobile Router/UE-1 is a home user (i.e. connecting to its HPLMN) and the UE-2 is a roamer (i.e. connecting to a VPLMN) during procedures described in the previous embodiment for their respective cases. With the decision and action, the UE-2 can disconnect from the cellular access and enjoys communication via the Mobile Router/UE-1 except only when it is required to connect the cellular access for some operator specific service which is allowed only via the cellular access. According to the described method, the UE-2 would be notified through the paging over the Mobile Router/UE-1 to the UE-2. This would be beneficial for the user to pay less fee for the connection especially for the roaming case.

In the above case, the Mobile Router/UE-1 and UE-2 may connect same PLMN which is home PLMN for the Mobile Router/UE-1 and visited PLMN for the UE-2, otherwise they may do different PLMN (i.e. the Mobile Router/UE-1 connects to home PLMN and the UE-2 to visited PLMN).

Also in the above roaming case, the MME may decide to perform the context binding (Pseudo-Detach) based on the roaming agreement (e.g. if such binding is allowed by the home or visited operator) or subscription of UE-1 and/or UE-2 (e.g. if such binding is allowed with a specific UE or mobile router respectively).

Embodiment 11: Explicit Detach Indication to UE

In the operation in the above described embodiments, the Mobile Router/UE-1 (101), Router/UE-1 (1101), and Mobile Relay/UE-1 (1201) can indicate to the UE-2 (102) in the Non-3G HO Ack message, e.g. step 2010 or 3011', that the 3GPP connection of the UE-2 (102) can be torn down. Such indication could be achieved by using the IEEE802.11u ANQP messages, or the extended DHCP Response or RA message. This will help the UE-2 (102) to initiate the 3G interface disconnection procedure instead of relying on network to disconnect. It would have less impact on the network infrastructure.

Embodiment 12: Mobile Router to Remove UE

As the mobile networking will have much dynamics in the connection, the connection and services provided by the Mobile Router/UE-1 (101), Router/UE-1 (1101), or Mobile Relay/UE-1 (1201) to the UE-2 (102) may also change. This could be due to various reasons, e.g. the uplink connection from the UE-1 (101/1101/1201) to the operator's network has changed, or the UE-1 (101) has initiated some other important application running, or there are too much terminals connected to it. In such cases, maybe it does no longer make sense for some of the UE-2 (102), e.g. with low or lower priority, or of less benefit to keep the connection, to connect via the Mobile Router/Router/Mobile Relay, as the QoS may greatly degrade because of the change of situation as described above. Therefore, the Mobile Router/Router/Mobile Relay may indicate information about its current or assumable/possible support of QoS level and/or load situation on the Mobile Router/Router/Mobile Relay or backbone network of it to the UE-2 (102) via the non-3GPP access, e.g. using the IEEE802.11u ANQP or additional announcements as that defined in Hotspot2.0, etc. This way, UE-2 (102) may be able to decide dynamically if it should change the connection back to the 3GPP connections.

In order to support the smooth transitions of the UE-2 (102) connections, other than realtime information, the Mobile Router/UE-1 (101), Router/UE-1 (1101), and Mobile Relay/UE-1 (1201) may also indicate its predictions of its services level, e.g. it may indicate that the QoS may drop in 1 min due to new application being initializing, or a paging for a specific high bandwidth and/or high priority service has been received for one of the terminals associated with it, etc. This way, the UE-2 (102) will have more time to power on its 3G interface and avoids potential interruptions to the services and user experiences.

Embodiment 13: Context Aggregation/Binding Also for Some Packet Services Limited Only Via 3G Access In the previous descriptions, the target has been supporting the network initiated NAS layer signaling towards the UE when it is only connected to the non-3GPP access. This allows the support of CS services, or any other services that rely on the NAS layer signaling to the UE. However, it is clear that the invention can also be used to support the other type of services with minor enhancements. For example, certain operator controlled services are normally only available through the PS domain of the 3GPP access. Therefore, when the UE-2 (102) switches connection to the non-3GPP access, such services would be terminated, e.g. due to the teardown of the PDN connection with the controlled APN, etc. In that case, the UE-2 (102) would not be able to obtain the services.

However, as shown in FIGS. 1, 8, 9, and 10, the UE-2 (102) is actually connected to the operator's core network (120) via UE-1 (101)'s 3GPP connections. Therefore, the operator should be able to relax the term and allow the same service to be delivered to UE-2 (102) even though the connection appears to be non-3GPP access. This can be achieved by the Operator's Core Network (120) control entities, e.g. MME (123), or PGW (801), or the Policy and Charging Control Functions (PCRF) that is not drawn out in the figures, become aware of the pseudo-detach status of the UE-2 (102) and associating the UE-2 (102)'s non-3GPP access to the Mobile Router/UE-1 (101)'s 3GPP connections. With this association, the MME (123) can still keeps the PS domain context for the services for UE-2 (102) and bind that to the (E)MM/(E)SM context of UE-1 (101). The MME (123) or the PCRF can further instruct the PGW (801) to redirect the service data towards the UE-1 (101), with additional identifiers, e.g. via a dedicated bearer, such that the UE-1 (101) can relay it to UE-2 (102).

With the above operation, the UE-2 (102) can still receive the operator's services when connected through the non-3GPP access via UE-1 (101). This saves the need for the operator to page the UE-2 (102) and bring its 3G interface on to receive such services. It therefore saves both network signaling resources and the UE-2 (102) battery There are different methods for the Operator's Core Network (120) control entities to obtain the relationship between UE-2 (102) and UE-1 (101). For example, with the procedure illustrated in FIGS. 2 and 3, the LIPA-GW (141)/PGW (801) can learn that from the Non-3G Handover Signaling, e.g. 2007, 3009. And, such information can be propagated to MME (123) and PCRF via a signaling flag or additional IEs.

Each functional block used in the description of the embodiment as given above can be realized as LSI, typically represented by the integrated circuit. These may be produced as one chip individually or may be designed as one chip to include a part or all. Here, it is referred as LSI, while it may be called IC, system LSI, super LSI, or ultra LSI, depending on the degree of integration. Also, the technique of integrated circuit is not limited only to LSI and it may be realized as a dedicated circuit or a general-purpose processor. FPGA (Field Programmable Gate Array), which can be programmed after the manufacture of LSI, or a reconfigurable processor, in which connection or setting of circuit cell inside LSI can be reconfigured, may be used. Further, with the progress of semiconductor technique or other techniques derived from it, when the technique of circuit integration to replace LSI may emerge, the functional blocks may be integrated by using such technique. For example, the adaptation of bio-technology is one of such possibilities.

INDUSTRIAL APPLICABILITY

The invention has the advantage of allowing a mobile terminal to access a local IP access via the non-3GPP access and still enjoys the CS service indication even with its 3GPP access detached. Therefore, the invention can be advantageously used as the management for the remote local IP access in a mobile communication system.

The invention claimed is:

1. A communication system comprising:
a mobile terminal which is connected to a 3GPP network through a base station to use a predetermined service, the mobile terminal transmitting a handover request signaling for handover directly to a router being a new connection destination in a case where the mobile terminal connects to the 3GPP network through the router by handover;
the router which transmits a non-3GPP handover signaling directly to a gateway of a home network of the mobile terminal on the basis of the handover request signaling, the non-3GPP handover signaling including identification information of the router and identification information of the mobile terminal; and
a mobility management entity which, on the basis of a release request signaling transmitted from the gateway, binds a context of the mobile terminal to a context of the router and releases the 3GPP connection of the mobile terminal before the handover, the release request signaling including the identification information of the router and the identification information of the mobile terminal and requesting the release of the 3GPP connection of the mobile terminal before the handover.

2. The communication system according to claim 1, wherein the mobility management entity determines whether or not to bind the contexts, on the basis of location information of the mobile terminal and the router.

3. The communication system according to claim 2, wherein before transmitting the handover request signaling, the mobile terminal confirms the router has a function of paging proxy on the basis of the identification information of the router, and then transmits signaling for updating the location information of the mobile terminal to the mobility management entity.

4. The communication system according to claim 1, wherein after receiving the handover request signaling, the router determines whether or not the mobile terminal belongs to a predetermined group to which the router belongs, and transmits the non-3G handover signaling when the router determines that the mobile terminal belongs to the predetermined group.

5. The communication system according to claim 1, wherein the mobility management entity identifies the router by using the bound context of the router to the context of the mobile terminal upon receipt of a trigger of the predetermined service for the mobile terminal, and transmits a signaling to the mobile terminal through a 3GPP signaling bearer between the mobility management entity and the router, the signaling comprising paging of the predetermined service.

6. The communication system according to claim 5, wherein in a case where the signaling comprising the paging of the predetermined service, the router pages the mobile terminal by using the paging of the predetermined service.

7. The communication system according to claim 5, wherein in a case where the signaling comprising the paging of the predetermined service and where there is a specific data bearer between the router and the gateway for the mobile terminal, the router removes the data bearer or lowers a quality of service in the data bearer.

8. The communication system according to claim 1, wherein
the router is a mobile router; and
the mobility management entity makes use of a mobility management context of the mobile router to manage mobility of the mobile terminal for 3GPP Circuit Switch service preservation after the mobility management entity binds the context of the mobile terminal to the context of the router.

9. A mobile terminal which is connected to a 3GPP network through a base station to use a predetermined service, the mobile terminal connects to the 3GPP network through a router being a new connection destination by handover, the mobile terminal comprising one or more processing circuits and a memory configured to:
determine before the handover is performed, whether or not the router has a function of paging proxy on the basis of identification information of the router;
transmit a signaling for updating location information of the mobile terminal to a mobility management entity, when the router has the function of the paging proxy is determined; and
generate a handover request signaling for the handover to the router, and transmit the generated handover request signaling directly to the router, wherein
the router transmits a non-3GPP handover signaling directly to a gateway of a home network of the mobile terminal on the basis of the handover request signaling, the non-3GPP handover signaling including identification information of the router and identification information of the mobile terminal; and
a mobility management entity binds a context of the mobile terminal to a context of the router on the basis of a release request signaling transmitted from the gateway, and releases the 3GPP connection of the mobile terminal before the handover, the release request signaling including the identification information of the router and the identification information of the mobile terminal and requesting the release of the 3GPP connection of the mobile terminal before the handover.

10. The mobile terminal according to claim 9, wherein
the router is a mobile router; and
the mobility management entity makes use of a mobility management context of the mobile router to manage mobility of the mobile terminal for 3GPP Circuit Switch service preservation after the mobility management entity binds the context of the mobile terminal to the context of the router.

11. A router which is a new connection destination for a mobile terminal connected to a 3GPP network through a base station to use a predetermined service, the mobile terminal connects to the 3GPP network through the router by handover, the router comprising one or more processing circuits and a memory configured to:
receive a handover request signaling for the handover directly from the mobile terminal;
generate a non-3GPP handover signaling including identification information of the router and identification information of the mobile terminal, on the basis of the received handover request signaling; and
transmit the generated non-3GPP handover signaling directly to a gateway of a home network of the mobile terminal, wherein
a mobility management entity binds a context of the mobile terminal to a context of the router on the basis of a release request signaling transmitted from the gateway, and releases the 3GPP connection of the mobile terminal before the handover, the release request signaling including the identification information of the router and the identification information of the mobile terminal and requesting the release of the 3GPP connection of the mobile terminal before the handover.

12. The router according to claim 11, further configured to determine, after the handover request signaling is received, whether or not the mobile terminal belongs to a predetermined group to which the router belongs, and further configured to transmit the non-3GPP handover signaling when the mobile terminal belongs to the predetermined group is determined.

13. The router according to claim 11, further configured to, in a case where signaling transmitted from a mobility management entity and including paging of the predetermined service is received, page the mobile terminal by using the paging of the predetermined service.

14. The router according to claim 11, further configured to, in a case where signaling transmitted from a mobility management entity and including paging of the predetermined service is received, and where there is a specific data bearer between the router and the gateway for the mobile terminal, remove the data bearer or lower a quality of service in the data bearer.

15. The router according to claim 11, wherein the router is a mobile router; and the mobility management entity makes use of a mobility management context of the mobile router to manage mobility of the mobile terminal for 3GPP Circuit Switch service preservation after the mobility management entity binds the context of the mobile terminal to the context of the router.

16. A mobility management entity which manages mobility of a mobile terminal connected to a 3GPP network through a base station to use a predetermined service, the mobile terminal connects to the 3GPP network directly through a router being a new connection destination by handover, the mobility management entity comprising one or more processing circuits and a memory configured to:

receive a release request signaling transmitted directly from a gateway of a home network of the mobile terminal, the release request signaling including identification information of the router and identification information of the mobile terminal and requesting release of the 3GPP connection of the mobile terminal before the handover;

bind a context of the mobile terminal to a context of the router on the basis of the received release request signaling; and release the 3GPP connection of the mobile terminal before the handover.

17. The mobility management entity according to claim 16, further configured to determine whether or not to bind the contexts, on the basis of location information of the mobile terminal and the router.

18. The mobility management entity according to claim 16, further configured to:

generate a signaling and where a trigger of the predetermined service for the mobile terminal is received, the signaling including paging of the predetermined service;

identify the router by using the bound context of the router to the context of the mobile terminal; and transmit the generated signaling to the mobile terminal through a 3GPP signaling bearer between the mobility management entity and the router.

19. The mobility management entity according to claim 16, wherein the router is a mobile router; and the mobility management entity makes use of a mobility management context of the mobile router to manage mobility of the mobile terminal for 3GPP Circuit Switch service preservation after the mobility management entity binds the context of the mobile terminal to the context of the router.

\* \* \* \* \*